(12) United States Patent
Martin, IV

(10) Patent No.: US 11,072,292 B1
(45) Date of Patent: Jul. 27, 2021

(54) HANGER ENTRAPMENT SYSTEM

(71) Applicant: Robert A. Martin, IV, Kettering, OH (US)

(72) Inventor: Robert A. Martin, IV, Kettering, OH (US)

( * ) Notice: Subject to any disclaimer, the term of this patent is extended or adjusted under 35 U.S.C. 154(b) by 0 days.

(21) Appl. No.: 16/751,921

(22) Filed: Jan. 24, 2020

(51) Int. Cl.
*B60R 7/10* (2006.01)

(52) U.S. Cl.
CPC .................................... *B60R 7/10* (2013.01)

(58) Field of Classification Search
CPC ....... B60R 7/10; B60R 11/00; Y10S 224/927; A47G 25/0692
See application file for complete search history.

(56) References Cited

U.S. PATENT DOCUMENTS

| | | | |
|---|---|---|---|
| 2,927,719 A * | 3/1960 | Wareham | B60R 7/10 224/550 |
| 2,945,595 A | 7/1960 | Gardner | |
| 2,969,881 A | 1/1961 | Lily | |
| 3,002,666 A * | 10/1961 | Silverman | B60R 7/10 224/561 |
| 3,355,031 A | 11/1967 | Kleehammer | |
| 3,481,483 A | 12/1969 | Harvey | |
| 3,567,034 A * | 3/1971 | Mozelsio | E05B 69/006 211/7 |
| 3,708,093 A * | 1/1973 | Toms, II | B60R 7/10 224/560 |
| 4,361,241 A * | 11/1982 | Stoddard | A47F 7/24 211/123 |
| 4,494,896 A * | 1/1985 | DiFranco | B60P 3/00 211/105.3 |
| 4,629,065 A * | 12/1986 | Braaten | A63B 60/60 206/315.1 |
| 4,729,482 A * | 3/1988 | Nicholson | A47K 10/04 211/105.2 |
| 5,104,083 A | 4/1992 | Shannon | |
| 5,328,068 A | 7/1994 | Shannon | |
| 5,330,244 A | 7/1994 | Rodwell | |
| 5,405,067 A | 4/1995 | Huges | |
| 5,890,689 A * | 4/1999 | Johnson | B60R 7/10 248/208 |
| 5,894,968 A | 4/1999 | Christensen | |
| 8,616,425 B2 | 12/2013 | Gobart et al. | |
| 9,290,133 B1 * | 3/2016 | Bishop | A47F 5/0884 |
| 9,387,810 B1 | 7/2016 | Bishop | |
| 9,402,494 B1 * | 8/2016 | O'Brien | A47F 7/19 |
| 10,081,306 B2 | 9/2018 | Zaccaria et al. | |
| 10,099,626 B1 * | 10/2018 | Gallaher | B60R 7/10 |
| 10,449,908 B1 * | 10/2019 | Bishop | B60R 11/00 |
| 2002/0153337 A1 * | 10/2002 | Shuen | A47G 25/0692 211/123 |
| 2006/0278594 A1 * | 12/2006 | Macon | A47G 25/0692 211/123 |
| 2008/0156837 A1 | 7/2008 | Brightman | |
| 2010/0044403 A1 * | 2/2010 | Humphreys | B60R 7/10 223/88 |
| 2013/0113230 A1 * | 5/2013 | Gobart | B60R 13/0212 296/1.08 |
| 2014/0110446 A1 | 4/2014 | Carter | |
| 2015/0274082 A1 | 10/2015 | Khazadian | |
| 2019/0191910 A1 * | 6/2019 | Davis | A47G 25/0692 |

* cited by examiner

*Primary Examiner* — Brian D Nash
(74) *Attorney, Agent, or Firm* — Dawsey Co., LPA; David J. Dawsey

(57) ABSTRACT

A clothing hanging system designed to be used in automobiles with built-in safety features.

20 Claims, 32 Drawing Sheets

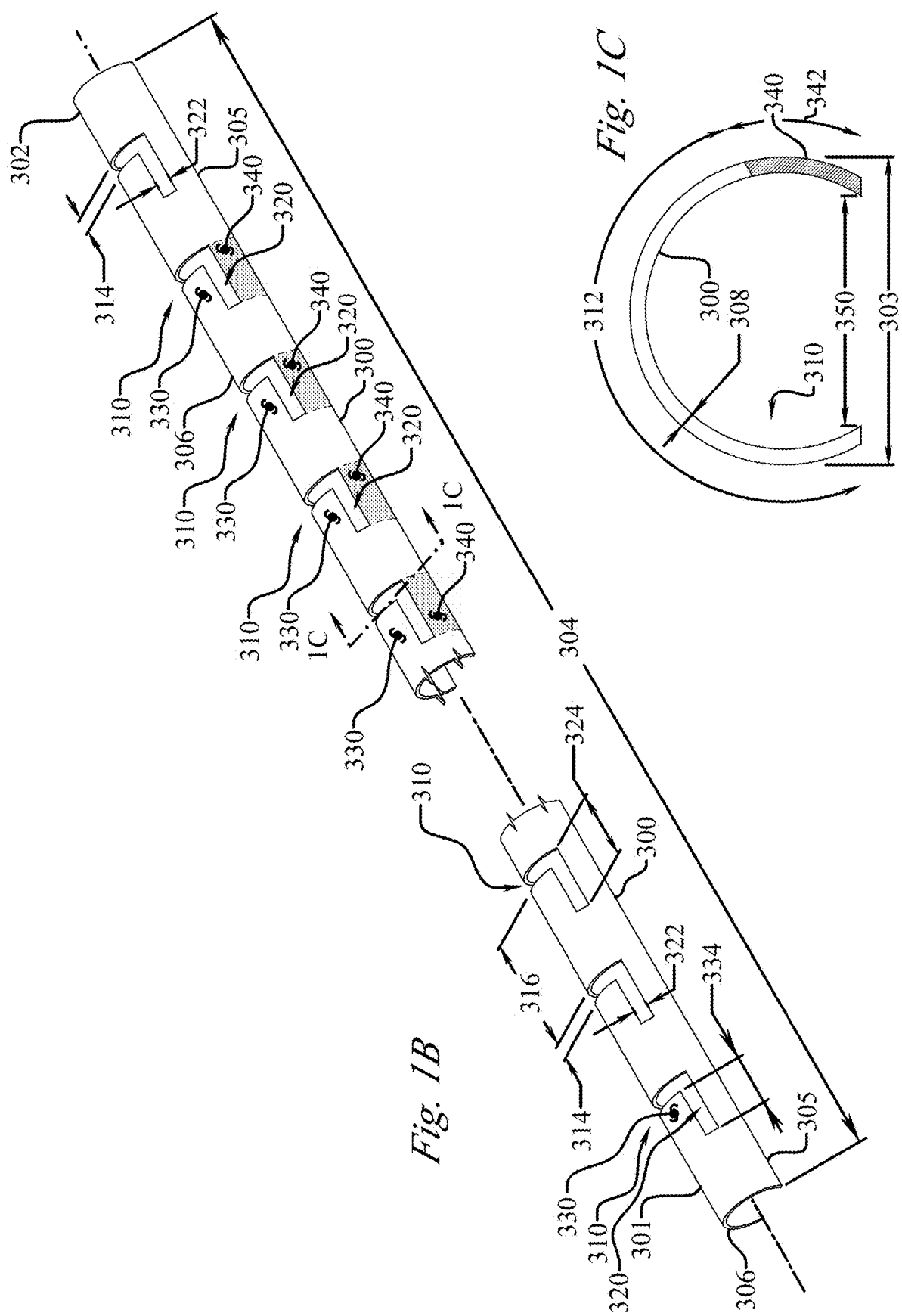

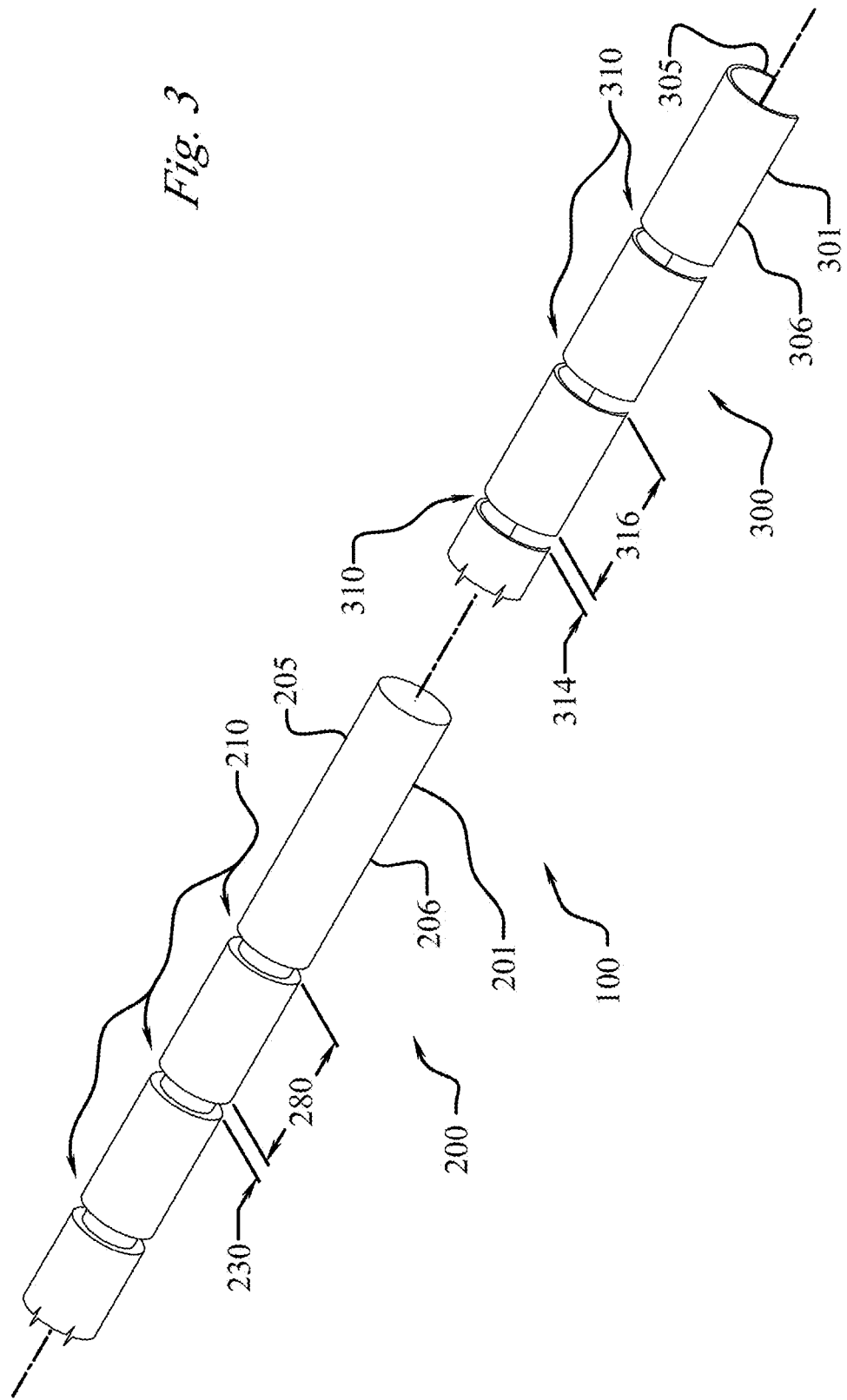

HANGER ENTRAPMENT SYSTEM

CROSS-REFERENCE TO RELATED APPLICATIONS

Not applicable.

TECHNICAL FIELD

The present disclosure relates to the field of apparel hanging systems, more specifically apparel hanging systems meant for use in automobiles.

BACKGROUND OF THE INVENTION

As one skilled in the art will appreciate, transporting articles of clothing in automobiles can prove challenging. If some clothes that require ironing are not hung from hangers, wrinkles are sure to ensue. Many attempts have been tried to provide a clothes hanging system for automobiles to remedy the problem of wrinkled clothes during transport. However, these various systems create potential safety issues associated with clothes and hangers becoming dislodged in the cases of a rapid stop or accident.

SUMMARY OF INVENTION

In its most general configuration, the presently disclosed hanger entrapment system is an automobile clothing hanging system. Furthermore, the hanger entrapment system seeks to remedy the dangers posed by earlier attempts at creating a means of hanging clothes in an automobile. Those skilled in the art will appreciate that unlike the prior art, the current invention locks the installed clothing hangers in place.

BRIEF DESCRIPTION OF THE DRAWINGS

Without limiting the scope of the hanger entrapment system and system as claimed below and referring now to the drawings and figures:

FIG. 1B is an isometric view of an embodiment of a cover, not to scale;

FIG. 1C is a cross-sectional view of a cover embodiment referenced in FIG. 1B, not to scale;

FIG. 3 is a partial sinistral side exploded isometric view of an embodiment of a hanger entrapment system support and cover, not to scale;

Figure 1A:
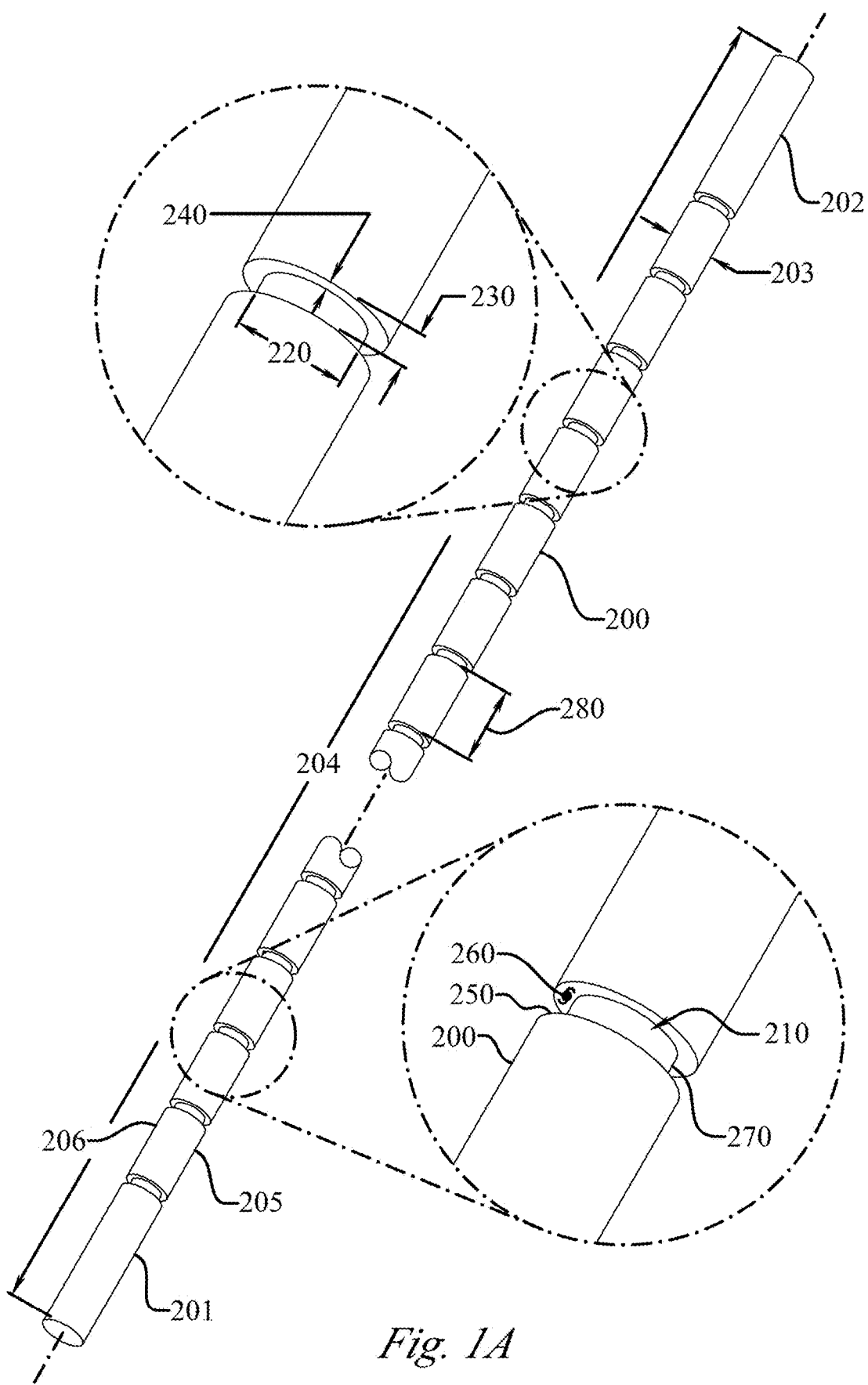
FIG. 1A is an isometric view of an embodiment of a hanger entrapment system support, not to scale.

These drawings are provided to assist in the understanding of the exemplary embodiments of the presently disclosed hangar entrapment system, as described in more detail below and should not be construed as unduly limiting the hangar entrapment system. In particular, the relative spacing, positioning, sizing and dimensions of the various elements illustrated in the drawings are not drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

The hanger entrapment system (100) of the instant invention enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Each year people are injured from clothes and hangers that have become dislodged from transportation vehicle clothes hanging systems. A hanger entrapment system (100) of the present invention is designed for safely securing clothes hangers (400) on a hanger entrapment system support (200) designed to hang clothes. The hanger entrapment system (100) includes a hanger entrapment system support (200), as seen in FIG. 1A, and a cover (300), as seen in FIG. 1B, which releasably attaches one or more clothes hangers (400) unto the hanger entrapment system support (200). The hanger entrapment system support (200) may be securely attached inside a transportation vehicle for hanging clothes during transport and prevention of wrinkling. The hanger entrapment system support (200) includes a support proximal end (201), a support distal end (202), a support width (203), a support length (204), a support dextral side (205), a support sinistral side (206) and, a plurality of support recesses (210), as illustrated in FIG. 1A. The support length (204) defines an axial direction, and a transverse direction is one that is substantially perpendicular to the axial direction.

Additionally, the hanger entrapment system support (200) includes a recess separation distance (280), which is defined as the distance between each of the plurality of support recesses (210) and their adjacent support recesses (210), as illustrated in FIGS. 1 and 3. The hanger entrapment system support (200) or the cover (300) may be composed of, but not limited to: metal, plastic, wood, composite materials, or a combination thereof, and may be rolled, stamped, or molded achieve the claimed relationships. Furthermore, in some embodiments the hanger entrapment system support (200) may a multi-material support having a metal core that is covered with a plastic, or vice versa. In one such embodiment the metal core may have an I-beam shape, in another embodiment the metal core may have a triangular tube shape, in yet another embodiment the metal core may have a square tube shape. Additionally, the inner surface of the cover (300) and/or the outer surface of the support (200) may further have a friction reducing coating along the sliding interface portions. The support recesses (210) may be formed by the region created between projections extending from the support (200) and need not extend all the way around the support (200).

Figure 11A:
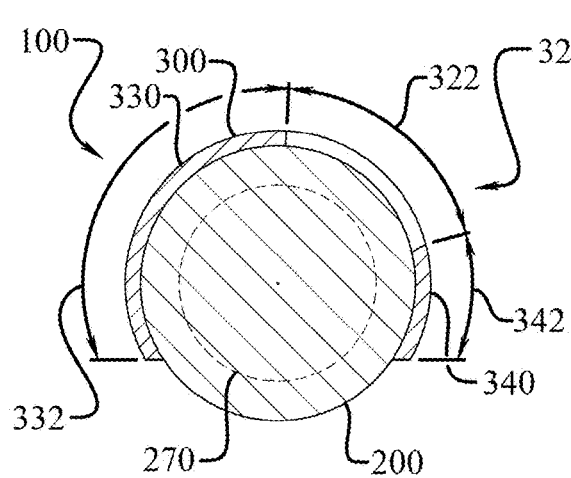
FIG. 11A is a cross-sectional view of a hanger entrapment system support and cover embodiment, not to scale.

In one embodiment, the hanger entrapment system support (200) cross-sectional profile may be circular in shape as seen in FIG. 11A, while in another embodiment it may have an oval or ellipsoidal shape, in still a further embodiment it may be triangular, square, or rectangular, while in yet another embodiment, the hanger entrapment system support (200) may have a complex compound shape as seen in FIGS. 39-44. In fact, the cross-sectional profile may be any structural shape including, but not limited to, wide flange, bearing pile, American standard, channel, tee, hollow tube, angle, and pipe, As such, the cross-sectional profile need not be uniform throughout the entire support length (204), although in one embodiment the cross-sectional profile is uniform throughout at least 50% of the support length (204), and at least 75% in a further embodiment, and at least 95% in yet another embodiment, and a full 100% in a final embodiment. In these embodiments the cover (300) is configured to engage the hanger entrapment system support (200) and permit relative movement in an axial direction while also preventing separation in a transverse direction. The separation prevention may be accomplished in a number of manners such as provided by a plurality of tabs, or a continuous rail, extending inward from the cover support member (340), effectively creating a cover throat dimension (350), seen in FIG. 1C, that is less than a transverse dimension of the cover (300).

Figure 34:
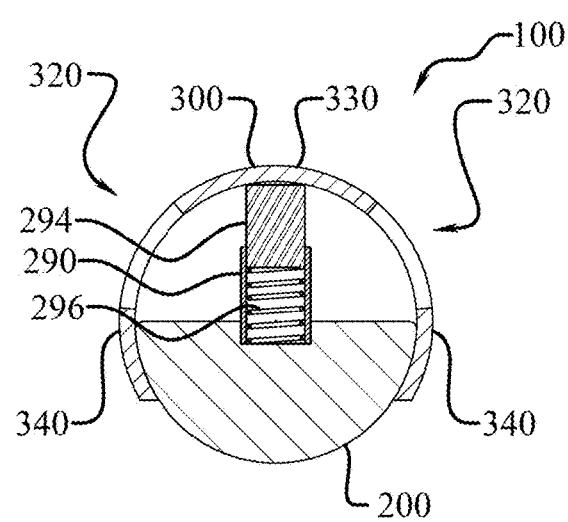
FIG. 34 is a cross-sectional view of a hanger entrapment system support and cover embodiment, not to scale.
Figure 35:
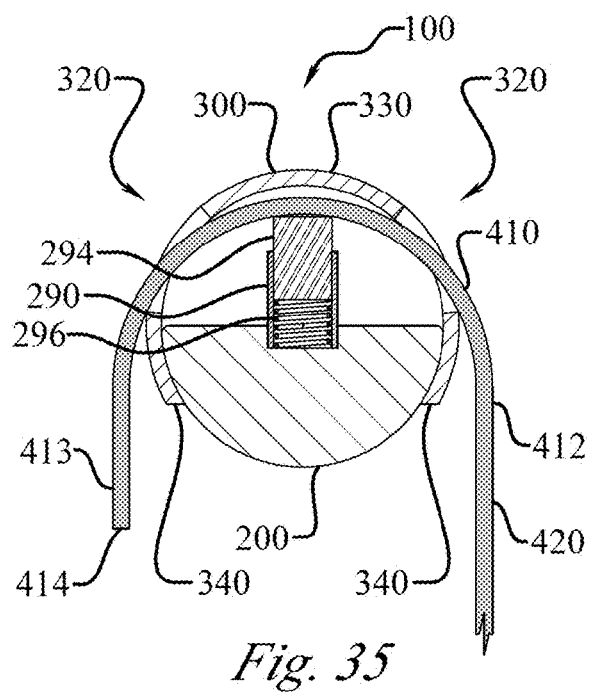
FIG. 35 is a cross-sectional view of a hanger entrapment system support, cover and hanger, not to scale.

Now addressing the plurality of support recesses (210), each support recess (210) may include a recess width (220), a recess length (230), a recess depth (240), a recess proximal sidewall (250), a recess distal sidewall (260), and a recess floor (270), as seen in FIG. 1A. Additionally, each support recess (210) may further include a support compression member (290) having a compression member height (292) as seen in FIGS. 30-35. Furthermore, the compression member (290) may be composed of, but not limited to: elastomeric material; a fiber pad such as felt; a cork material; a compressible spring; a composite material; or a combination thereof. In yet another embodiment, the compression member (290) may be comprised of a compression member plunger (294) and a compression member bias device (296), as seen in FIGS. 34 and 35. The compression member plunger (294) may be comprised of, but not limited to: an elastomeric material, a metallic material, a hard polymer material such as plastic, wood, a composite material, or a composite thereof. The compression member bias device (296) may be comprised of, but not limited to: a spring; a compressible material; or a compressible gas bladder. In one embodiment the compression member bias device (296) may provide a bias force of a range between 1 N and 27 N of force, in another embodiment the compression member bias device (296) may provide a bias force of a range between 2 N and 9 N of force, in yet another embodiment the compression member bias device (296) may provide a bias force of a range between 4 N and 8 N of force, in still yet another embodiment the compression member bias device (296) may provide a bias force of a range not less than 5 N of force.

Figure 2A:
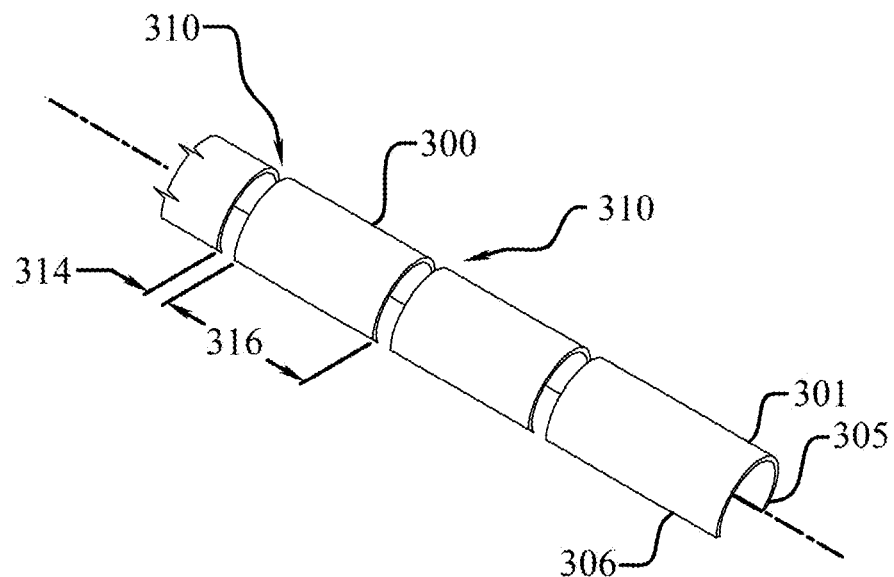
FIG. 2A is a sinistral side isometric view of an embodiment of a cover, not to scale.
Figure 2B:
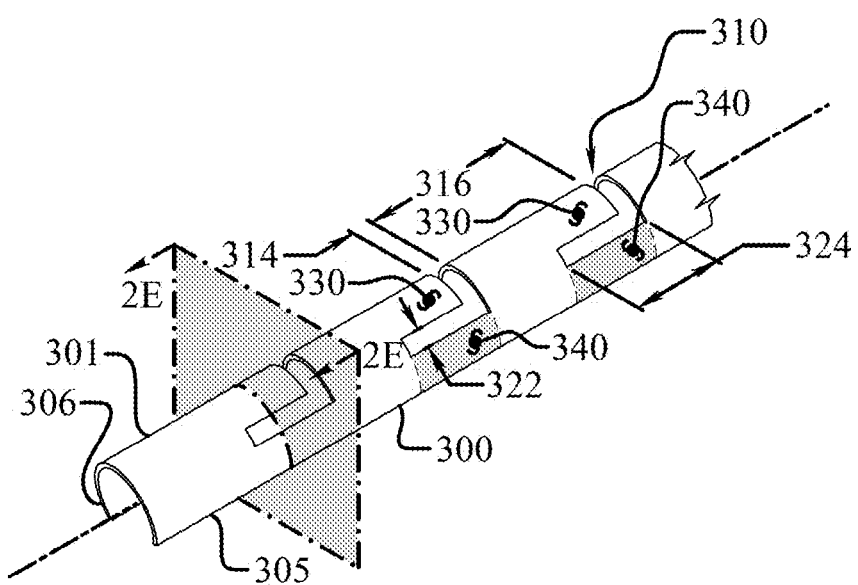
FIG. 2B is a dextral side isometric view of an embodiment of a cover, not to scale.
Figure 2C:
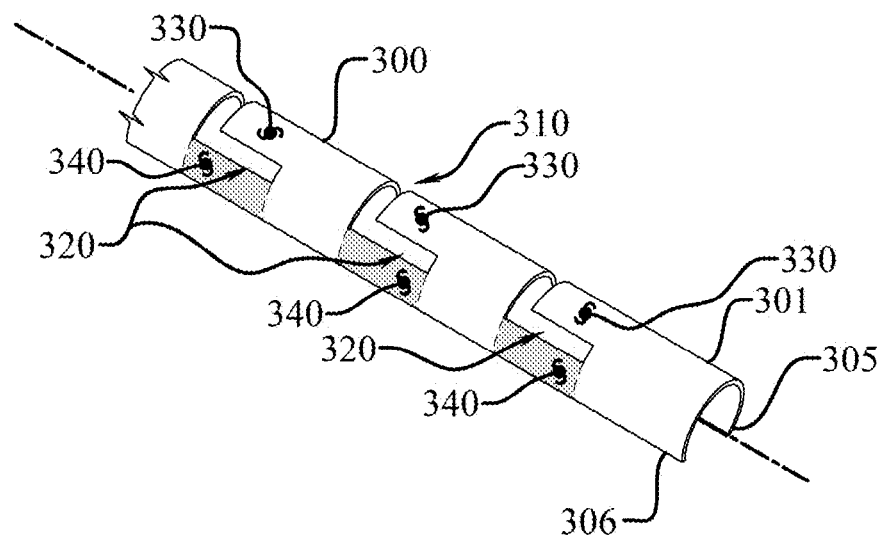
FIG. 2C is a sinistral side isometric view of an embodiment of a cover, not to scale.
Figure 2D:
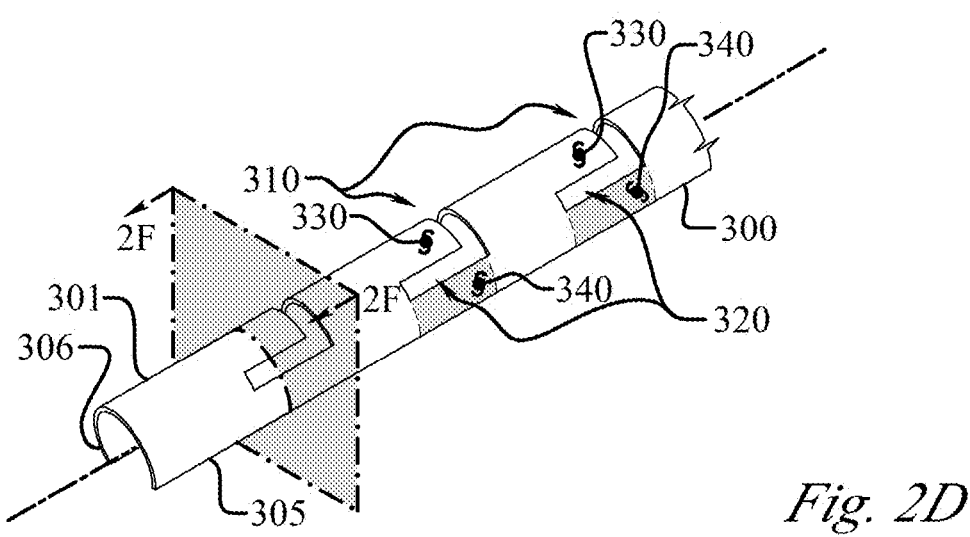
FIG. 2D is a dextral side isometric view of an embodiment of a cover, not to scale.
Figure 2E:
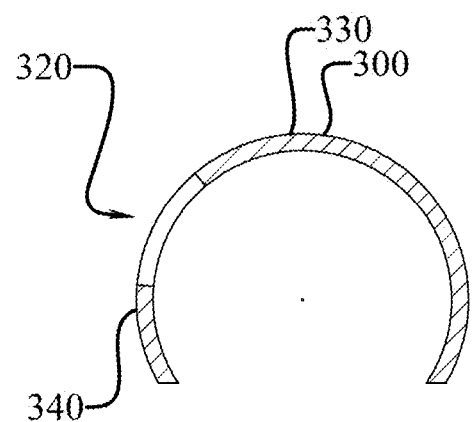
FIG. 2E is a cross-sectional view of a cover embodiment referenced in FIG. 2A, not to scale.

Now referring to FIG. 1B, 1C, 2A-2F, in one embodiment the cover (300) includes a cover proximal end (301), a cover distal end (302), a cover width (303), a cover length (304), a cover dextral side (305), a cover sinistral side (306), a cover thickness (308), a cover aperture (310) having an aperture width (312) and aperture length (314), and a aperture separation distance (316), a cover entrapment slot (320) having an entrapment slot width (322) and a entrapment slot length (324), and a cover support member (340). FIGS. 2A and 2B illustrate opposite sides of the same embodiment, namely one having the cover support members (340) extending inward from the edge along the cover dextral side (305), and in this embodiment the cover entrapment slot (320) is also located on the dextral half of the cover (300). Similarly FIGS. 2C and 2D illustrate opposite sides of another embodiment, namely one having a cover support member (340) extending inward from the edge along the cover dextral side (305), as seen in FIG. 2D and as just described with respect to FIGS. 2A and 2B, but also a second cover support member (340) extending inward from the edge along the cover sinistral side (306), as seen in FIG. 2C.

Ingress of the hanger (400) into the hanger entrapment system (100) may be facilitated by (A) the cover aperture (310) extending all the way to either the edge associated with the cover dextral side (305) or the edge associated with the cover sinistral side (306), as shown in FIGS. 1B, 1C, and 2A, or (B) an embodiment in which the cover aperture (310) does not extend to either edge, as shown in FIGS. 2C and 2D. Referring to situation (A), the opposing end of the cover aperture (310) does not extend all the way to the opposing side edge, rather is separated from the edge by the cover support member (340), best seen in FIGS. 1C and 2B, which provides structural integrity to the cover (300).

Figure 17:
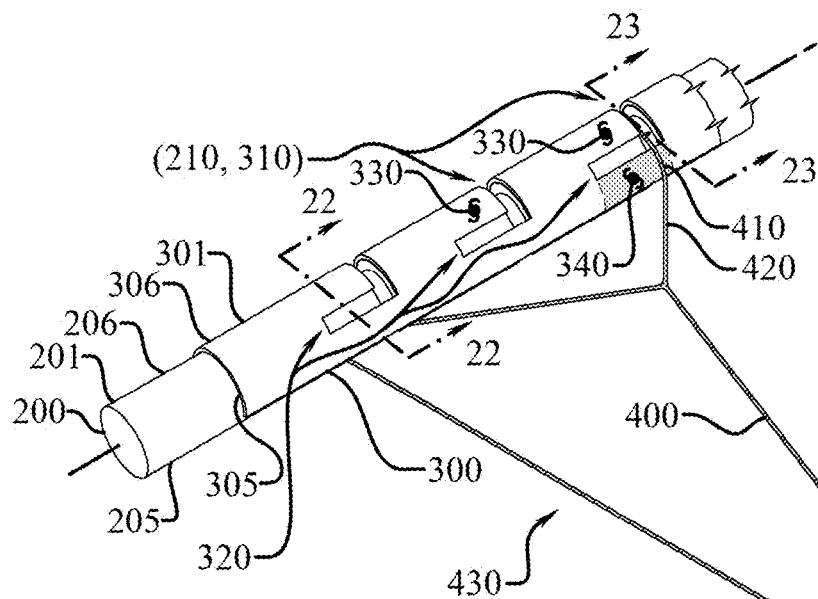
FIG. 17 is a partial dextral side isometric view of an embodiment of a hanger entrapment system support, cover and hanger, not to scale.
Figure 18:
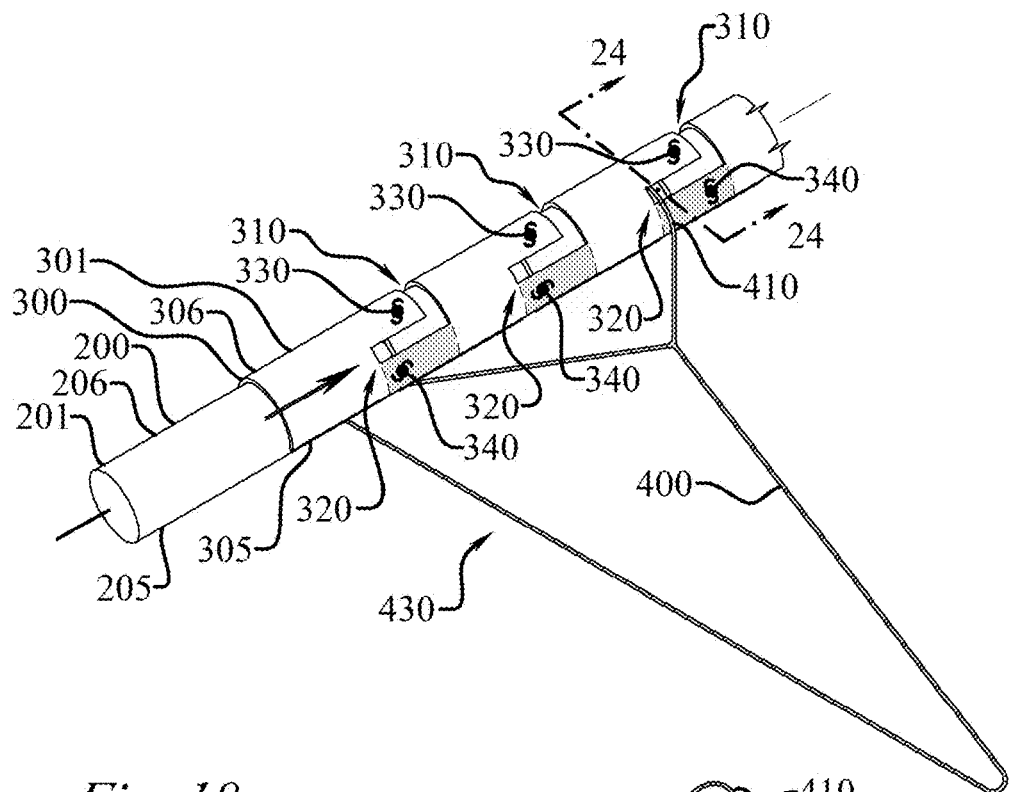
FIG. 18 is a partial dextral side isometric view of an embodiment of a hanger entrapment system support, cover and hanger, not to scale.
Figure 19:
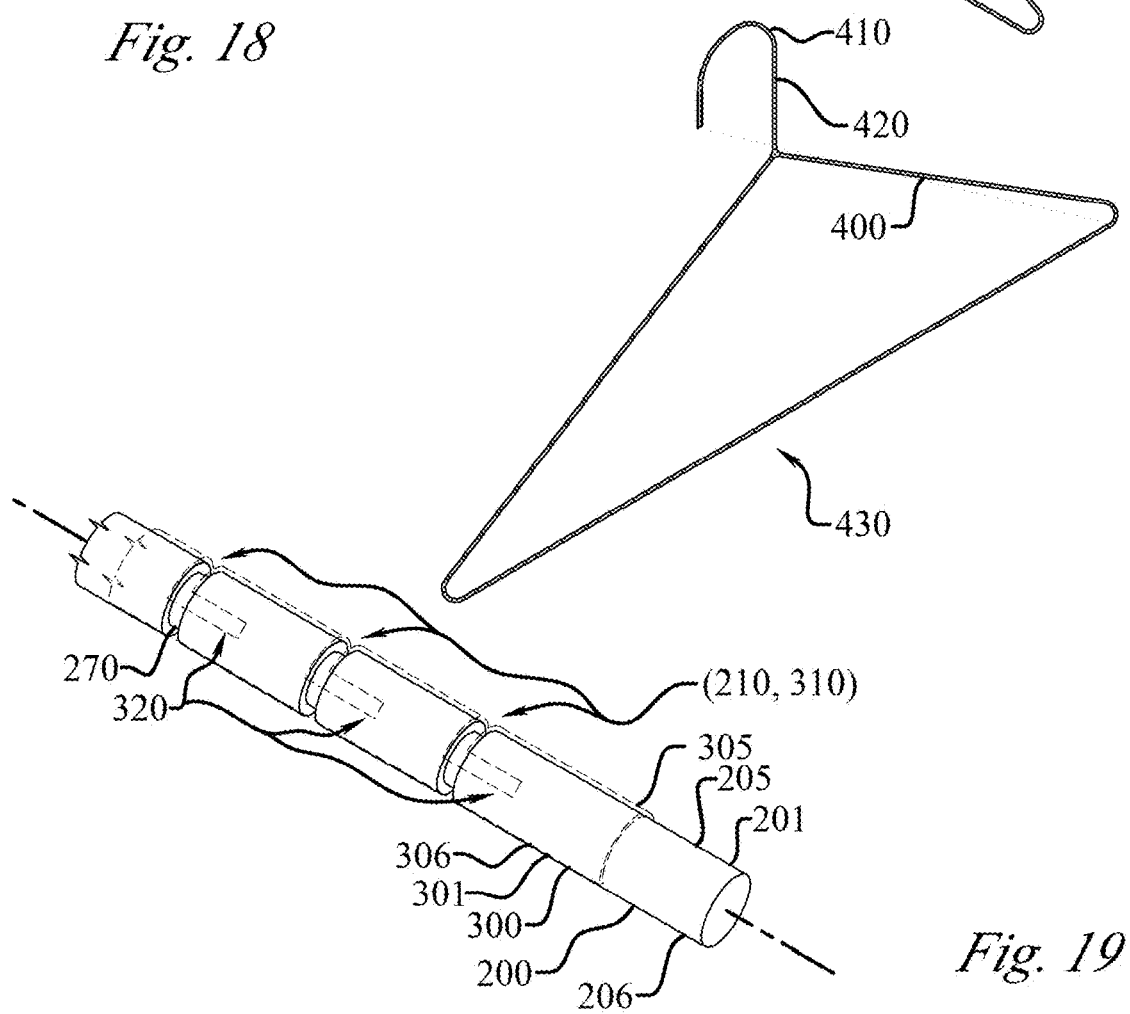
FIG. 19 is a partial sinistral side isometric view of an embodiment of a hanger entrapment system support, cover and hanger, not to scale.
Figure 20:
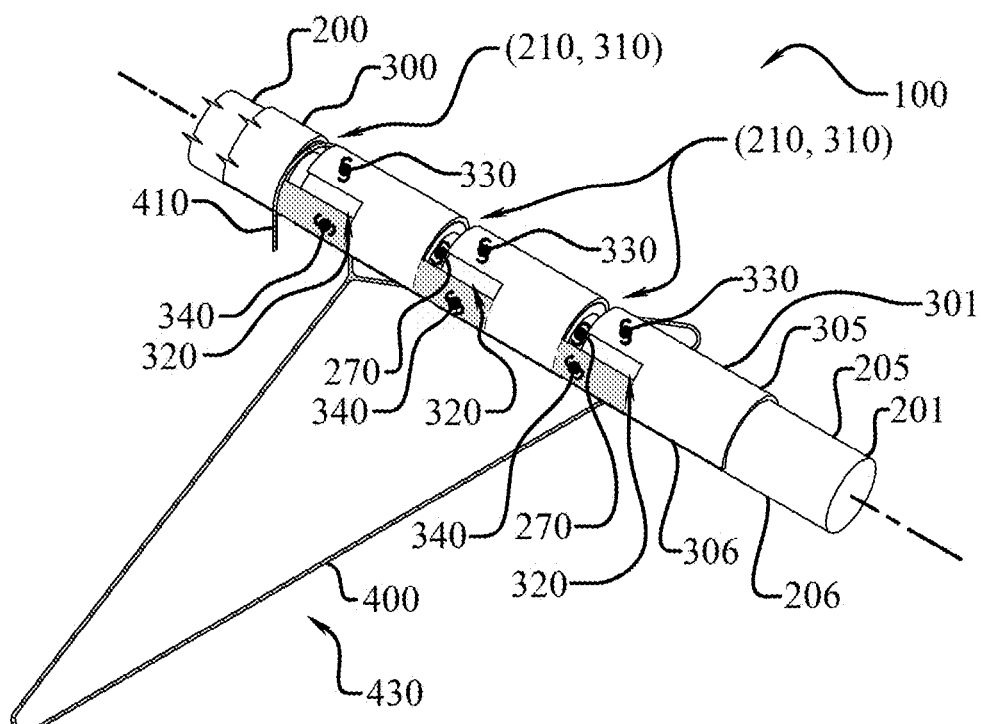
FIG. 20 is a partial sinistral side isometric view of an embodiment of a hanger entrapment system support, cover and hanger, not to scale.
Figure 21:
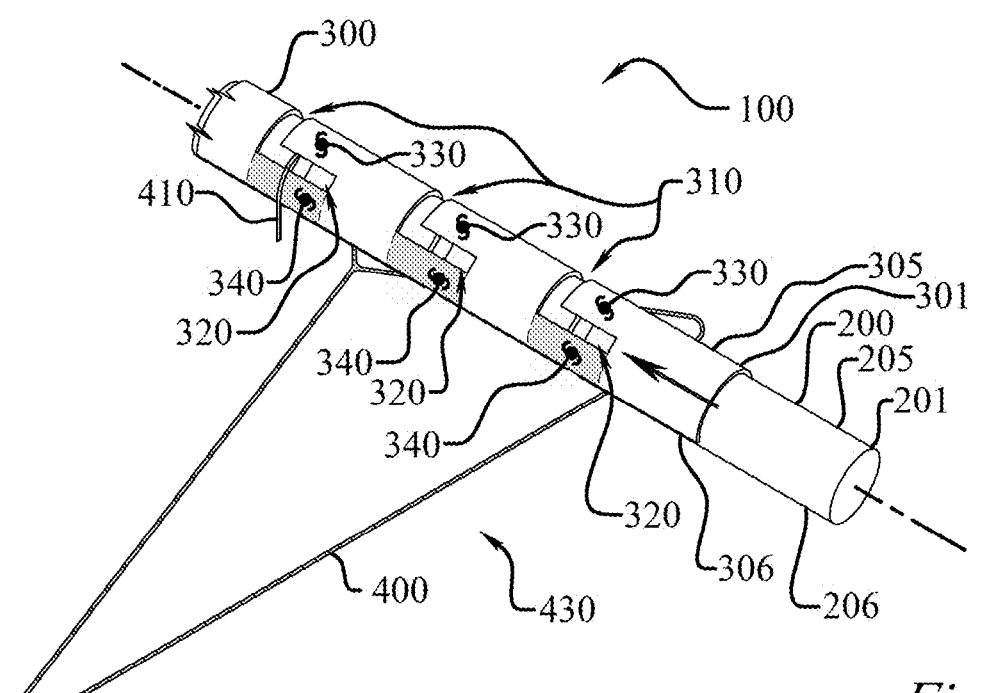
FIG. 21 is a partial sinistral side isometric view of an embodiment of a hanger entrapment system support, cover and hanger, not to scale.

As seen in FIG. 1C the aperture width (312) is the length of the aperture measured along the exterior surface of the cover (300) adjacent to the cover aperture (310) in a section perpendicular to a primary axis of the cover (300), and therefore in the illustrated embodiment is a length measured along the curve. In one embodiment the aperture width (312) is at least 50% of the total perimeter length of the cover (300) adjacent to the cover aperture (310), and at least 65% in another embodiment, and at least 80% in still a further embodiment. However, the structural integrity of the cover (300) is influenced by the length of the exterior surface, referred to as the cover support member width (342), the width terminology merely to be consistent with the aperture width (312) and multiple other "widths" in this disclosure that refer to surface lengths along an exterior surface of the cover (300). For instance, the embodiment of FIG. 22 (the location of the section is shown in FIG. 17), which will be described in more detail later, includes a cover support member (340) on each side, and the cover support member widths (342) are illustrated in a vertical direction, therefore the key is that orientation does not matter—the cover support member widths (342) are the length along the exterior surface. The aperture width (312) is preferably less than 5.0", and less than 4.0" in another embodiment, and less than 3.0" in still another embodiment. In another series of embodiments the aperture width (312) is at least 0.5", and at least 1.0" in another embodiment, and at least 1.5" in still a further embodiment. The aperture length (314) is preferably within 50% of the recess length (230), and within 40% in another embodiment, and within 25% in still a further embodiment. Likewise, the aperture separation distance (316) is preferably within 50% of the recess separation distance (280), and within 40% in another embodiment, and within 25% in still a further embodiment.

Thus, and referring again to FIG. 1C, in one embodiment the cover support member width (342) is at least 5% of the sum of the cover support member width (342) plus the aperture width (312), and at least 10% in another embodiment, at least 15% in still another embodiment, and no more than 40% in a further embodiment. In the referenced embodiments the cover support member (340) may terminate the cover aperture (310) to prevent the cover (300) from being divided into multiple separate sections, as seen in FIGS. 2B-2D, in other words—to keep it as a single unitary piece, although in other embodiments the cover (300) may consist of multiple individual sections independently engaging the support (200).

The relationship of the entrapment slot width (322), seen in FIG. 11A, to the aperture width (312), seen in FIG. 1C, is a delicate balance of ease of use and safety. In one particular embodiment the entrapment slot width (322) is no more than 60% of the aperture width (312), no more than 50% in a further embodiment, and no more than 40% in still another embodiment. Balancing these conflicting objectives, in a further series of embodiments the entrapment slot width (322) is at least 20% of the aperture width (312), or at least 30% in another embodiment. In yet another embodiment the aperture width (312) is greater than the cover throat dimension (350), at least 10% greater in another embodiment, and at least 25% greater in still a further embodiment. Likewise, referring to FIG. 1B, in another embodiment the entrapment slot length (324) is at least 50% greater than the aperture length (314), and at least twice that of the aperture length (314) in another embodiment, and at least three times as long in a further embodiment. However, another series of embodiments recognize the diminishing and negative returns associated with too extreme of a relationship and therefore the entrapment slot length (324) is no more than ten times the aperture length (314), and no more than eight times in another embodiment, and no more than six time in still a further embodiment. The entrapment slot length (324) is preferably at least 15% of the aperture separation distance (316), and at least 25% in a further embodiment, and at least 35% in still another embodiment. In a further series of embodiments, the entrapment slot length (324) is preferably no more than 75% of the aperture separation distance (316), and no more than 65% in another embodiment, and no more than 50% in still a further embodiment.

Figure 2F:
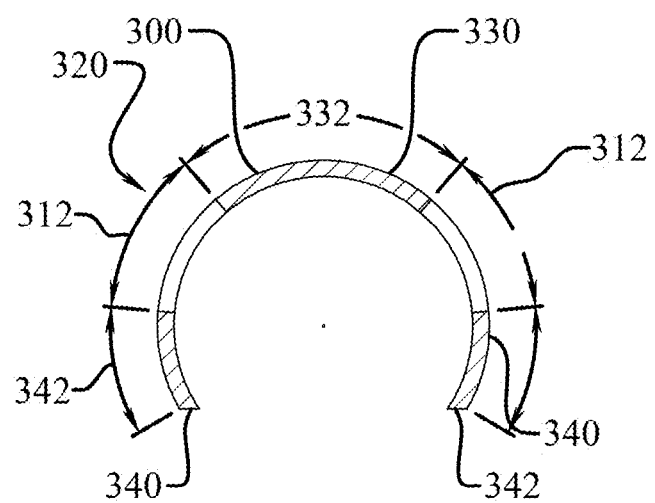
FIG. 2F is a cross-sectional view of a cover embodiment referenced in FIG. 2D, not to scale.

The embodiments of FIGS. 39-44 have a cover support member (340) present on both the cover dextral side (305) and the cover sinistral side (306). Further, one side, or both sides, may be continuous throughout the entire cover length (304). Referring to FIG. 1B, the cover (300) may further include a cover entrapment protrusion (330) having a protrusion width (332), illustrated in FIG. 22, and a protrusion length (334), as seen in FIGS. 1B and 2F. The protrusion width (332) is a dimension measured along the exterior surface of the cover entrapment protrusion (330), regardless of the orientation, which in the illustrated embodiments is the length along a curved surface, although one skilled in the art will recognize that this disclosure covers embodiments in which the support (200) and the cover (300) include non-curved surfaces. The measurement technique for the protrusion width (332) along the surface also applies to the aperture width (312) and the cover support member width (342), as illustrated in FIGS. 1C and 22, and the entrapment slot width (322) illustrated in FIG. 11A.

As disclosed throughout, the relationship of these widths, specifically, the aperture width (312), the entrapment slot width (322), the entrapment protrusion width (332), and the cover support member width (342), as well as the associated entrapment slot length (324), protrusion length (334), aperture separation distance (316), recess width (220), recess depth (240), and cover thickness (308) play a critical role in facilitating ease of use, accommodating a wide range of hanger sizes, and ensuring the hangers are secured within the hangar entrapment system (100) to reduce the risk that the forces exerted on the hanger (400) during a collision would bend, or deflect, the hanger hook (410) to the point that it could escape the confines created by engagement of the cover (300) and the support (200). Referring again to FIGS. 11A and 12A, the recess depth (240) is at least 50% of the entrapment slot width (322), and at least 100% and at least 150% in further embodiments; however, additional embodiments recognize a unique upper bound to this relationship so the benefits of ease-of-use do not reduces the safety, therefore in these embodiments the recess depth (240) is no more than 300% of the entrapment slot width (322), and no more than 250%, and no more than 200% in further embodiments. In some embodiments the entrapment slot width (322) is greater than the recess depth (240), and in another embodiment the entrapment slot width (322) is at least 50% greater than the recess depth (240), but in a further embodiment no more than 10 times the recess depth (240), and no more than 8 times in another embodiment, and no more than 6 times in an even further embodiment.

Figure 6A:
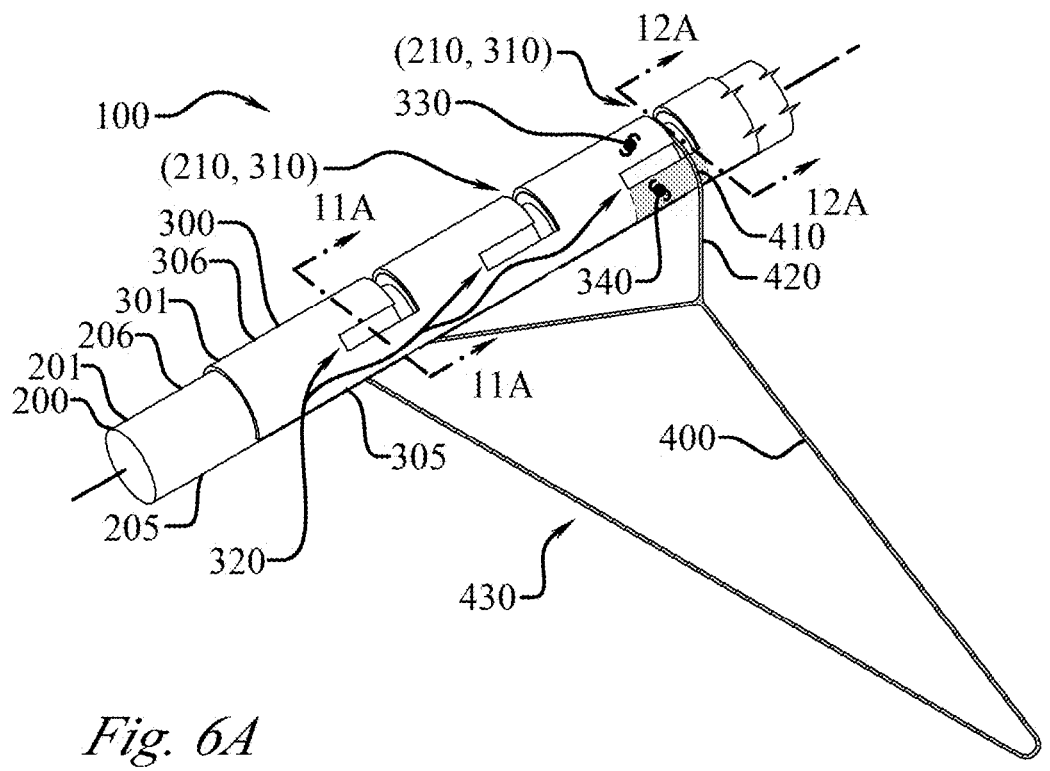
FIG. 6A is a partial dextral side isometric view of an embodiment of a hanger entrapment system support, cover and hanger, not to scale.
Figure 22:
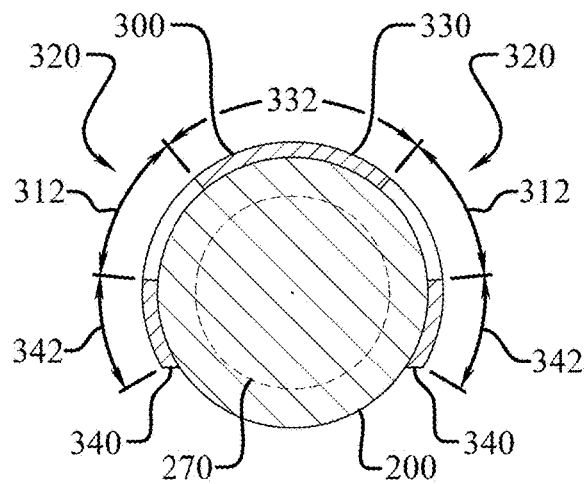
FIG. 22 is a cross-sectional view of a hanger entrapment system support and cover embodiment, not to scale.

The protrusion width (332) is seen best in (a) the section of FIG. 11A, which is taken in FIG. 6A and has the entrapment protrusion (330) extending from the edge of the cover sinistral side (306), or (b) the section of FIG. 22, which is taken in FIG. 17 and has a central entrapment protrusion (330), i.e. one not extending from edges of the cover dextral side (305) or the cover sinistral side (306). In one embodiment the protrusion width (332) is equal to or greater than the protrusion length (334), seen best in FIG. 1B, in another embodiment the protrusion width (332) may be at least 25% larger than the protrusion length (334), in yet another embodiment the protrusion width (332) may be at least 40% larger than the protrusion length (334), in still yet another embodiment the protrusion width (332) is no more than twice the protrusion length (334), and in still yet another embodiment the protrusion width (332) is no more than 1.75 times the protrusion length (334). The protrusion width (332) is preferably at least 25% of a cover throat dimension (350), seen in FIG. 1C, and at least 40% in another embodiment, and at least 55% in still a further embodiment. The protrusion width (332) is ideally at least 0.5", and at least 1.0" in another embodiment, and at least 1.5" in still a further embodiment. The protrusion width (332) is preferably no more than 8 times the entrapment slot width (322), and no more than 6 times in another embodiment, and no more than 5 times in still a further embodiment. In one embodiment the cover throat dimension (350) is preferably 1-4", and 1.5-3" in another embodiment, and 2-3" in still a further embodiment.

Figure 5:
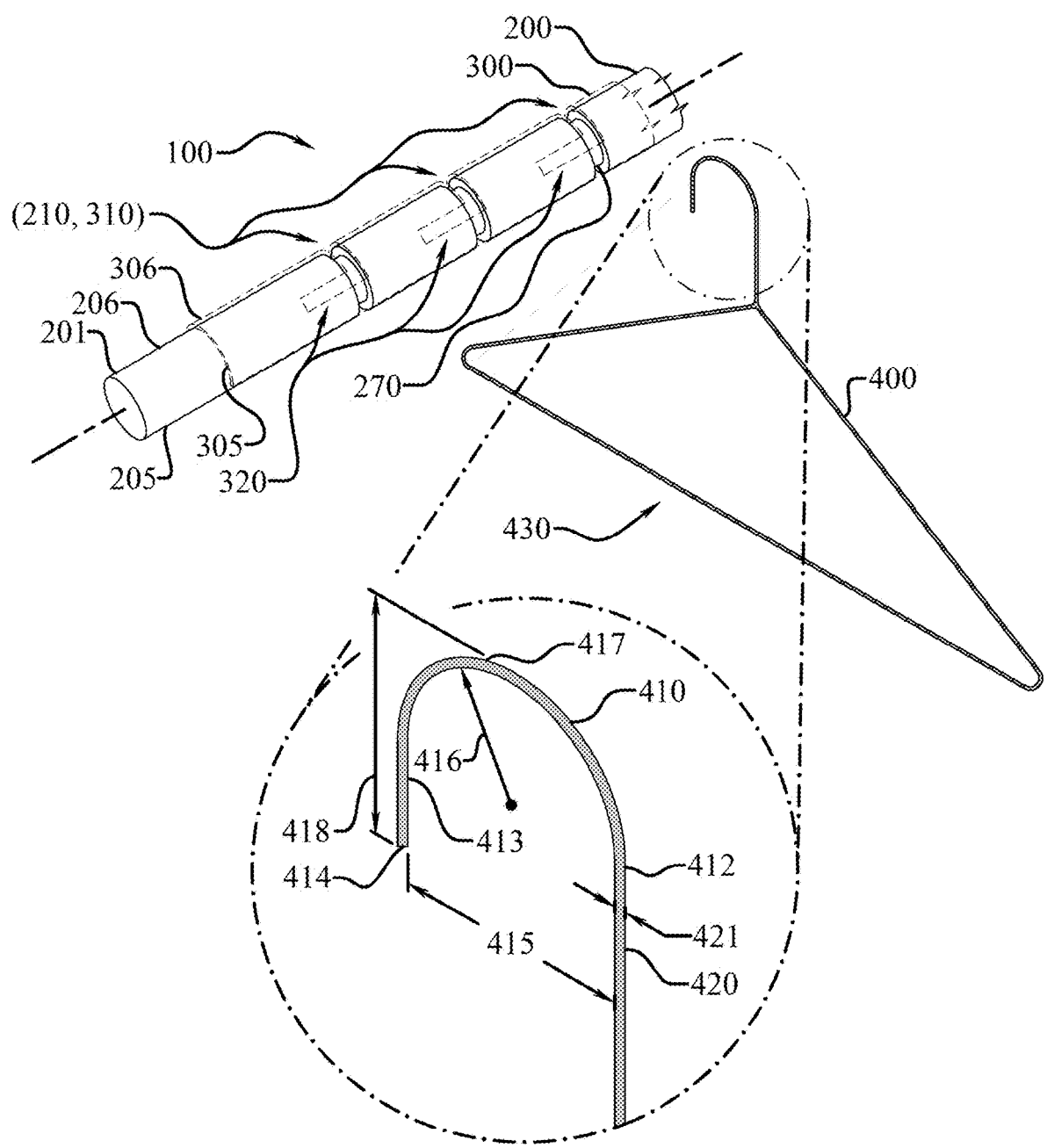
FIG. 5 is a partial dextral side isometric view of an embodiment of a hanger entrapment system support, cover and hanger, not to scale.

In one embodiment the aperture length (314) is 1.5 to 15 times larger than a hanger stem thickness (421), seen in FIG. 5, in another embodiment the aperture length (314) is 2 to 10 times larger than the hanger stem thickness (421), in yet another embodiment the aperture length (314) is 2.5 to 7.5 times larger than the hanger stem thickness (421). The aperture separation distance (316) is preferably at least twice the aperture length (314) and is at least three times the aperture length (314) in another embodiment, and at least five times in still another embodiment. Further, the aperture separation distance (316) is preferably at least 50% greater than the entrapment slot length (324), and at least 75% greater in another embodiment, and at least 100% greater in still a further embodiment.

Figure 4:
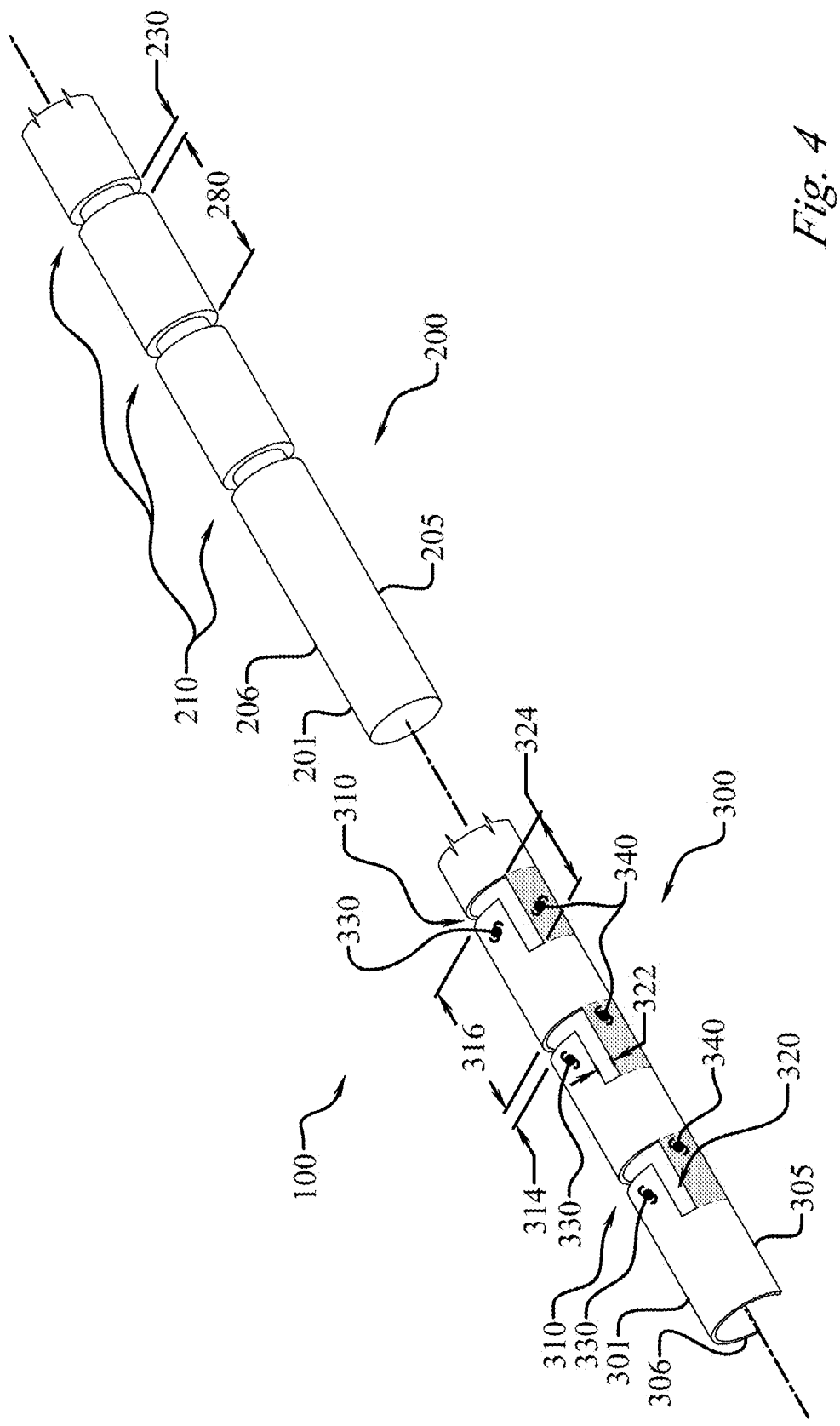
FIG. 4 is a partial dextral side exploded isometric view of an embodiment of a hanger entrapment system support and cover, not to scale.

FIGS. 3 and 4 show a portion of an unattached the hanger entrapment system support (200) in linear relation to a portion of the cover (300). Specifically, FIG. 3 shows an isometric sinistral side view of the hanger entrapment system support (200) and cover (300), and FIG. 4 shows an isometric dextral side view of the hanger entrapment system support (200) and cover (300). During the assembly of the hanger entrapment system (100), the cover (300) maybe slideably placed over the hanger entrapment system support (200). Alternatively, the cover (300) may be designed to flexibly expand and contract over the hanger entrapment system support (200) and securely clamp thereon, while still accommodating the sliding relative motion of the components necessary to entrap the hanger (400), as will be described in more detail later.

Secure engagement and cooperation of the support (200) and the cover (300) are essential to the safety of the use of the hanger entrapment system (100) in use so that the support (200) and cover (300) remain engaged during a collision, and thereby prevent clothing and hangers from flying about the cabin. Therefore, in one embodiment a cover throat dimension (350), seen in FIG. 1C, is less than the maximum support width (203). Thus, in some embodiments having the support (200) and cover (300) constructed of rigid materials, they must be joined by longitudinally mating and therefore will not separate during a collision. However, embodiments in which the cover throat dimension (350) may be expanded as it is forced over the support (200) in a transverse direction, additional safety features may be necessary. For instance in one embodiment the interior surface of the cover (300) includes a at least one projection that is received in a recess, or channel, formed in the outer surface of the support (200) so that during a collision the cover (300) does not rotate with respect to the support (200), while still allowing them to slide longitudinally with respect to one another. Similarly, another embodiment incorporates a reverse configuration whereby the recess, or channel, is formed in the interior surface of the cover (300) and the projection(s) are formed in the outer surface of the support (200). In either case, further embodiments incorporate an elastic barbed tip on the end of the projection to engage a shoulder within the recess, or channel, and ensure that once joined the components can only be separated by longitudinally sliding the cover (300) off of the support (200). Alternatively, an engagement member, or members, may span across the opening in the cover (300) once it is installed on the support (200) so that it cannot disengage the support (200) during a collision. Such an engagement member may include one or more straps that entirely encircle the hanger entrapment system (100), or simply connect the cover dextral side (305) to the cover sinistral side (306). In one embodiment there is an engagement member within 12" of the cover proximal end (301) and one within 12" of the cover distal end (302).

Figure 8:
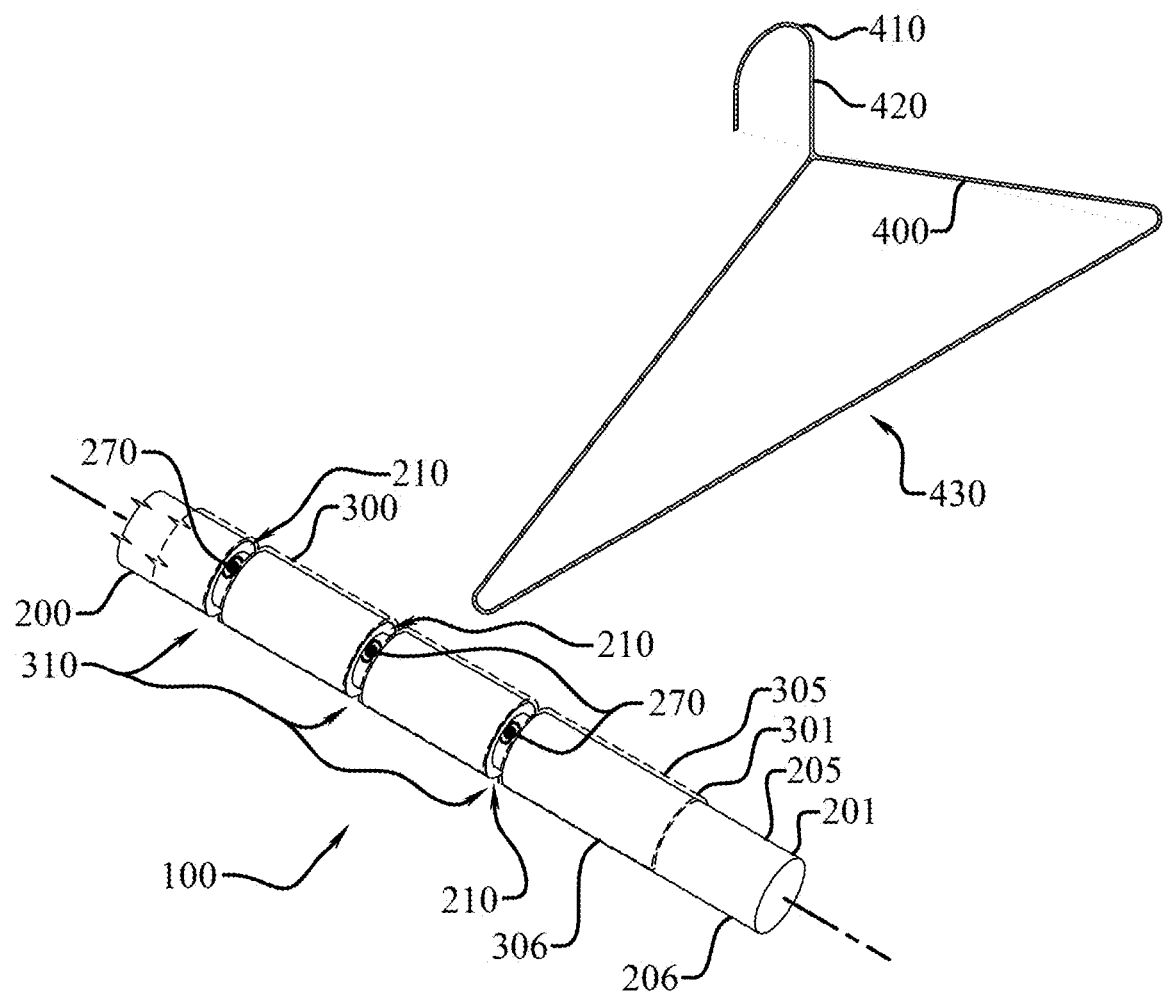
FIG. 8 is a partial sinistral side isometric view of an embodiment of a hanger entrapment system support, cover and hanger, not to scale.

Now referring to FIG. 5 and FIG. 8, which illustrates the opposite side, the hanger (400) used to secure clothes to the hanger entrapment system support (200) comprises a hanger hook (410), a hanger stem (420), and a hanger body (430) connected to the hanger hook (410) by the hanger stem (420). The cover (300) is shown in hidden lines in these figures to more clearly illustrate the support (200), while still illustrating their relative positions. The hanger hook (410) further comprises a hook dextral side (412), which is fixedly connected to the hanger stem (420), a hook sinistral side (413) having a hook sinistral side end (414), a hook dextral to sinistral side distance (415), a hook radius (416), a hook apex (417), a hook sinistral side end to hook apex distance (418), a hanger stem thickness (421). Hanger stem thickness (421) can vary between 2 mm and 9 mm depending on the manufacturer and material, typically 2-5 mm for wire hangers and 4-9 mm for plastic hangers. The hook radius (416) of the hanger (400) is typically 15-30 mm, and the hook dextral to sinistral side distance (415) is typically 30-55 mm. The disclosed sizes and relationships of the elements of the hanger entrapment system (100) are unique in accommodating a wide range of hangers while still ensuring retention of the hangers during a collision, while also retaining the hangers in a manner to reduce the likelihood of the hanger hooks (410) bending, or deflecting, in a manner that would allow them to escape the confines of the hanger entrapment system (100).

The hanger hook (410) sits in and straddles the support recess (210), as seen in the various embodiments of FIGS. 12A, 13A, 12B, 13B, 23, 24, 26, 27, 29, 31, 33, 35, 37 and 38. In one embodiment, the support recess width (220), seen in FIG. 1A, is 2 to 35% smaller than the hook dextral to sinistral side distance (415), in another embodiment the support recess width (220) is 5 to 20% smaller than the hook dextral to sinistral side distance (415), and in yet another embodiment the support recess width (220) is 10 to 15% smaller than the hook dextral to sinistral side distance (415). In another series of embodiments, the support recess width (220) is preferably less than 60 mm, while less than 50 mm in a further embodiment, and no more than 40 mm in still another embodiment. However, a further series of embodiments puts a floor on the range of the support recess width (220) to ensure safety and stability of the load during transit and collisions; specifically, in one embodiment the support recess width (220) is at least 20 mm, and at least 25 mm in another embodiment, and at least 30 mm in still a further embodiment. The support recess width (220) is a delicate balance of providing a size that allows for a wide range of hanger sizes, balanced with providing a size that meaningfully engages with the hanger stem (420) and/or hook sinistral side (413) so that a front-end, or rear-end, collision does not result in the hanger (400) and clothing from jumping off the hanger entrapment system (100) and reduces the likelihood of the hook sinistral side end (414) being bent, or deflected, to the point that the hanger (400) becomes disengaged.

The recess depth (240) is larger than the hanger stem thickness (421), yet in another embodiment the recess depth (240) is no greater than 10 times the hanger stem thickness (421), while in yet another embodiment the recess depth (240) is 2-8 times larger than the hanger stem thickness (421), and in still a further embodiment the recess depth (240) is no more than 5 times larger than the hanger stem thickness (421). In another series of embodiments, the recess depth (240) is at least 3 mm, and at least 5 mm in another embodiment, and at least 8 mm in yet a further embodiment. However, as with the support recess width (220), improved safety and security is found in embodiments that put a cap on the upper size of the recess depth (240), such as no more than 25 mm in one embodiment, and no more than 20 mm in another embodiment, and no more than 15 mm in yet another embodiment.

The recess length (230) is larger than the hanger stem thickness (421), yet in another embodiment the recess length (230) is no greater than 10 times the hanger stem thickness (421), while in yet another embodiment the recess length (230) is 2-8 times larger than the hanger stem thickness (421), and in still a further embodiment the recess length (230) is no more than 5 times larger than the hanger stem thickness (421). In another series of embodiments, the recess length (230) is at least 3 mm, and at least 5 mm in another embodiment, and at least 8 mm in yet a further embodiment. However, as with the support recess width (220), improved safety and security is found in embodiments that put a cap on the upper size of the recess length (230), such as no more than 25 mm in one embodiment, and no more than 20 mm in another embodiment, and no more than 15 mm in yet another embodiment.

Just as the support recess width (220) plays an important role in front and rear impact collisions, the recess length (230) and the recess depth (240) play important roles in retaining the hanger (400) during side impact collisions. In one particularly effective embodiment the recess depth (240) is continuous for at least 90 degrees of the perimeter of the support (200), and at least 135 degrees, at least 180 degrees, at least 225 degrees, at least 270 degrees, at least 315 degrees, and at least 360 degrees in still further embodiments.

Figure 6B:
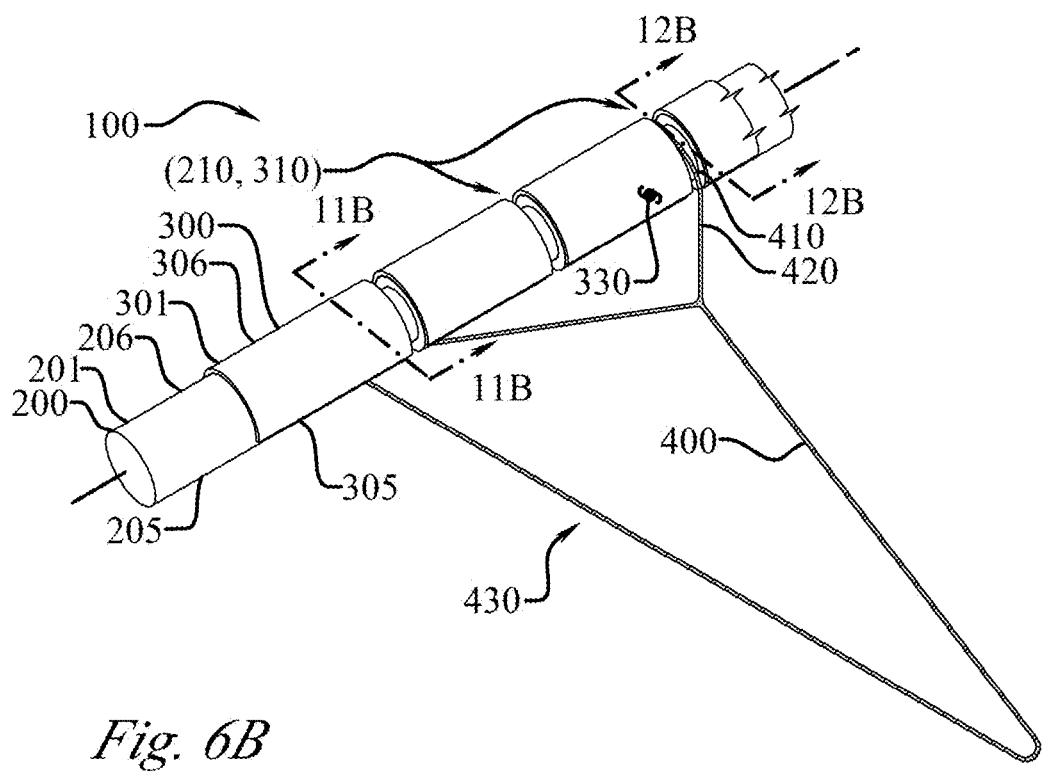
FIG. 6B is a partial dextral side isometric view of an embodiment of a hanger entrapment system support, cover and hanger, not to scale.
Figure 9A:
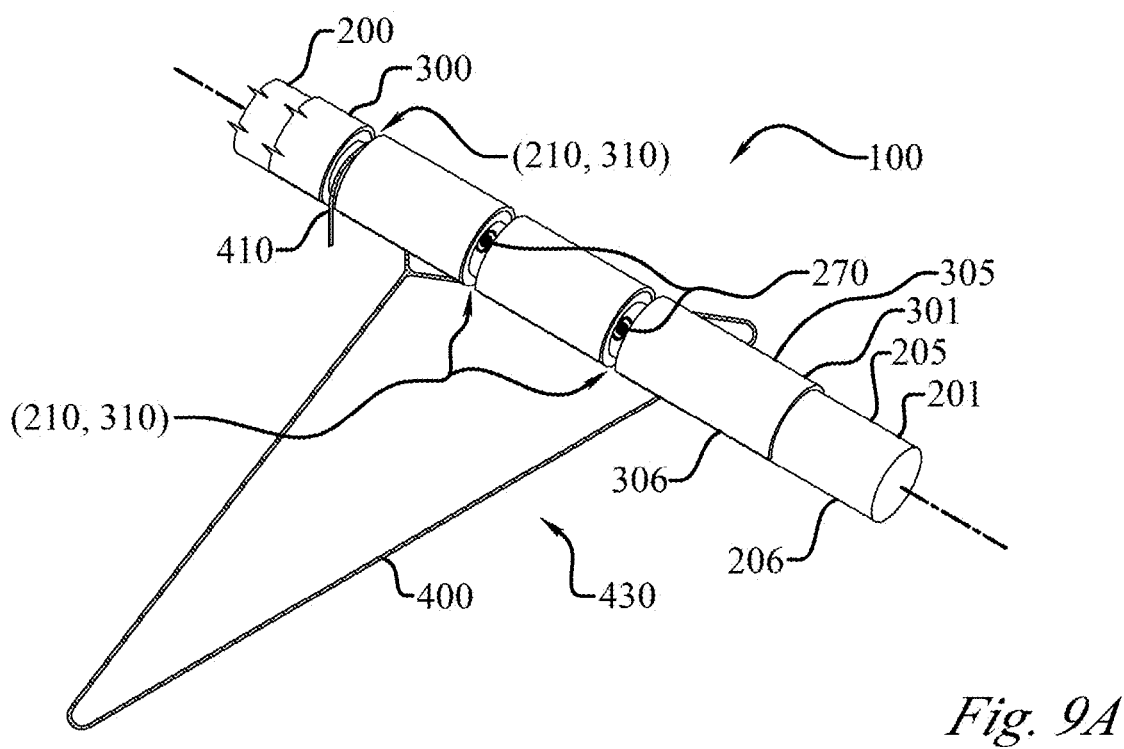
FIG. 9A is a partial sinistral side isometric view of an embodiment of a hanger entrapment system support, cover and hanger, not to scale.
Figure 9B:
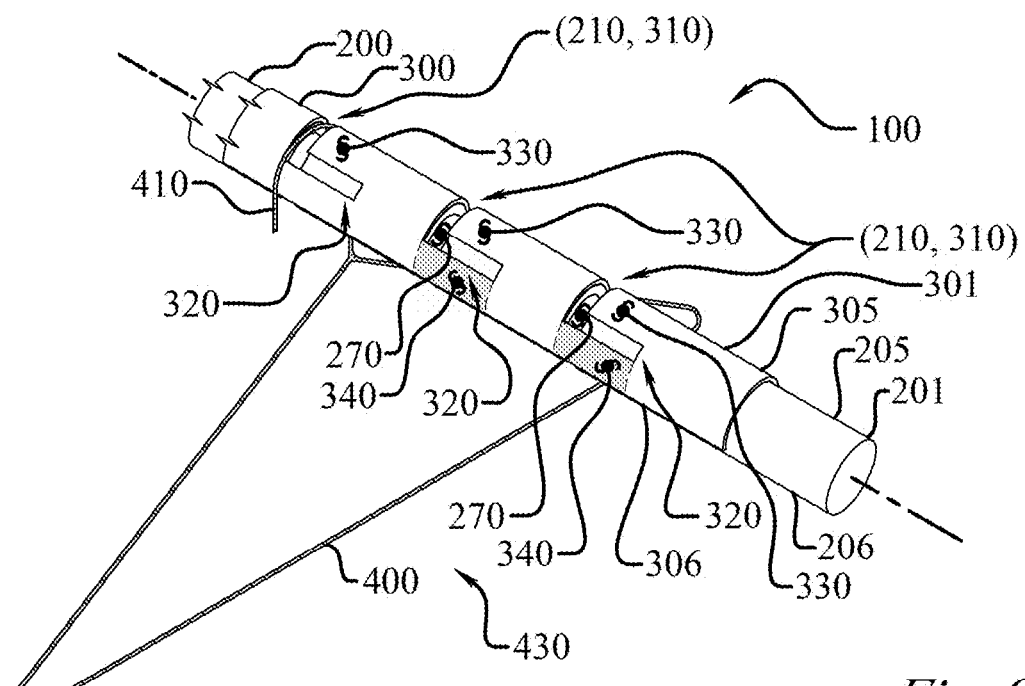
FIG. 9B is a partial sinistral side isometric view of an embodiment of a hanger entrapment system support, cover and hanger, not to scale.

During use, the user places clothes on the hanger body (430), and then places the hanger (400) onto the hanger entrapment system (100), more particularly through the cover aperture (310) into the support recess (210), as seen in FIGS. 5, 6A, and 6B (and the opposites sides in FIGS. 8, 9A, and 9B respectively). The support recess length (230) and the cover aperture length (314) are greater than the hanger thickness (440) so that proper placement of the hanger (400) is easily achieved, but not so large as to reduce the overall safety of the system (100). A key to the hanger entrapment system (100) is the safety afforded by the unique sizes and relationship of the components, and elements thereof, so as facilitate ease of use while limiting excess movement of the hanger (400) during a collision, which may result in torque levels on the hanger hook (410) that straighten the hanger hook (410) thereby permitting it to become disengaged from the hanger entrapment system (100) and fly dangerously about the cabin.

FIGS. 6A, 8, 9A and 12A show embodiments with the cover (300) positioned over the hanger entrapment system support (200) so that the plurality of cover apertures (310) are in alignment with the plurality of support recesses (210) to allow for easy placement of at least a portion of the hanger (400) through a cover aperture (310) and into a support recesses (210). As previously noted, some embodiments include a plurality of cover entrapment slots (320), a plurality of cover entrapment protrusions (330) and a plurality of cover support members (340) located on the cover dextral side (305) or the cover sinistral side (306). The support length (204) is preferably at 36"-96" and may be adjustable, which in one embodiment includes cooperating telescoping sections and in another embodiment includes individual extension sections that interlock with one another to provide the length adjustability. The support (200) includes at least 10 support recesses (210), and at least 20 in another embodiment, at least 30 in still a further embodiment, and at least 40 in a final embodiment. The support width (203) is 0.5-4.0", and 1.0-3.0" in a further embodiment, and 1.5-2.5" in yet another embodiment. The recess separation distance (280) is 0.25-6.0", and 0.5-5.0" in a further embodiment, and 0.75-4.0" in yet another embodiment.

Figure 7A:
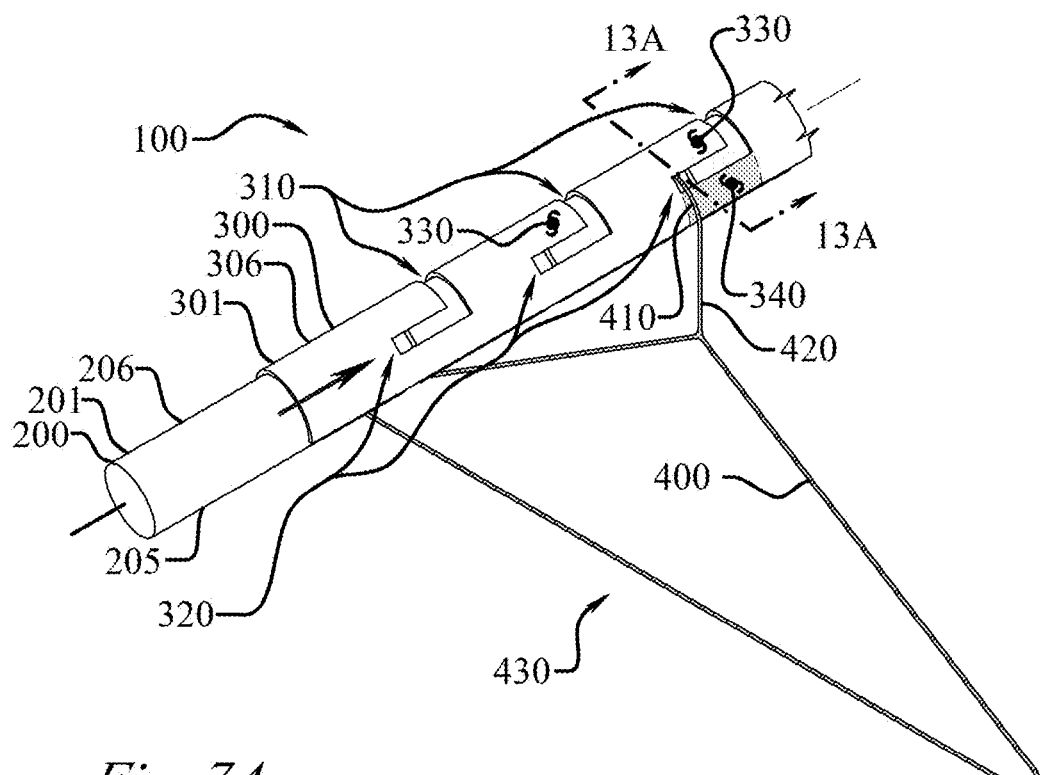
FIG. 7A is a partial dextral side isometric view of an embodiment of a hanger entrapment system support, cover and hanger, not to scale.

FIG. 7A, its opposite side in 10A, and 13A show the same embodiments with the relative position of the cover (300) and the support (200) moved from an open position into a secured position, thereby locking the hanger (400) in place. In order to place the cover (300) into a secured position, the user slides the cover (300) linearly along the hanger entrapment system support (200) where the cover entrapment protrusion (330) overlaps and entraps the hanger hook (410), or alternatively the user may slide the support (200) relative to the cover (300).

The cross section of FIG. 11A, the location of which is referenced in FIG. 6A, shows a cross-section of the hanger entrapment system support (200) and the cover (300) taken in an area that does not include a support recess (210). Next, the cross-section of FIG. 12A, the location of which is also shown in FIG. 6A, illustrates the location of alignment between the cover apertures (310) and the support recesses (210) so that at least a portion of the hanger hook (410) and the hanger sinistral side (413) are received in the support recess (210). Finally, the cross-section of FIG. 13A, the location of which is shown in FIG. 7A, illustrates entrapment of at least a portion of the hanger (400) within the support recesses (210) by the cover entrapment protrusion (330).

Figure 12A:
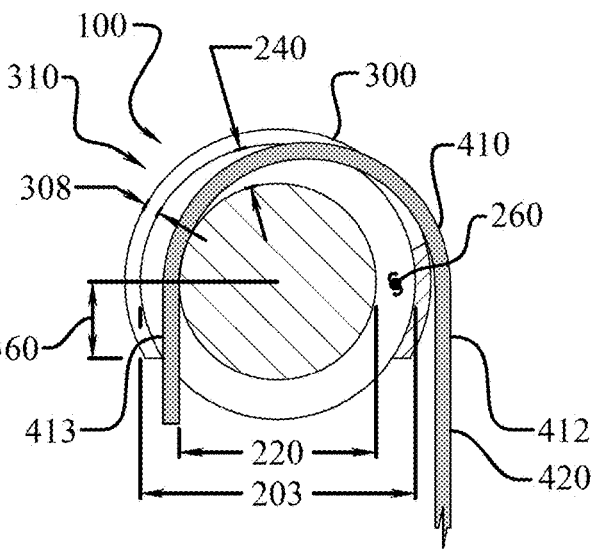
FIG. 12A is a cross-sectional view of a hanger entrapment system support, cover and hanger embodiment referenced in FIG. 6A, not to scale.

In this embodiment a portion of the hook dextral side (412) and the hanger stem (420) are separated from the support recess (210) by the cover support member (340), which may be on either side of the cover (300) or on both sides as seen in FIG. 22. In the illustrated embodiments of FIGS. 12A and 13A the hook sinistral side end (414) protrudes out from the bottom side of the cover (300), however this is dependent on the size and configuration of the hanger (400) and/or the size and configuration of the cover (300) adjacent the cover edge on the cover sinistral side (306). A cover edge overlap dimension (360) is illustrated in FIG. 12A and is a distance measured vertically from the cover edge to the centroid of a section through the support (200) at the support recess (210). In one embodiment preferred safety and load distribution are obtained when the cover edge overlap dimension (360) associated with either the edge of the cover sinistral side (306) and/or the edge of the cover dextral side (305), is at least as great as the recess depth (240), while in another embodiment the cover edge overlap dimension (360) is at least 25% greater than the recess depth (240), and at least 50% greater in still a further embodiment.

Figure 13A:
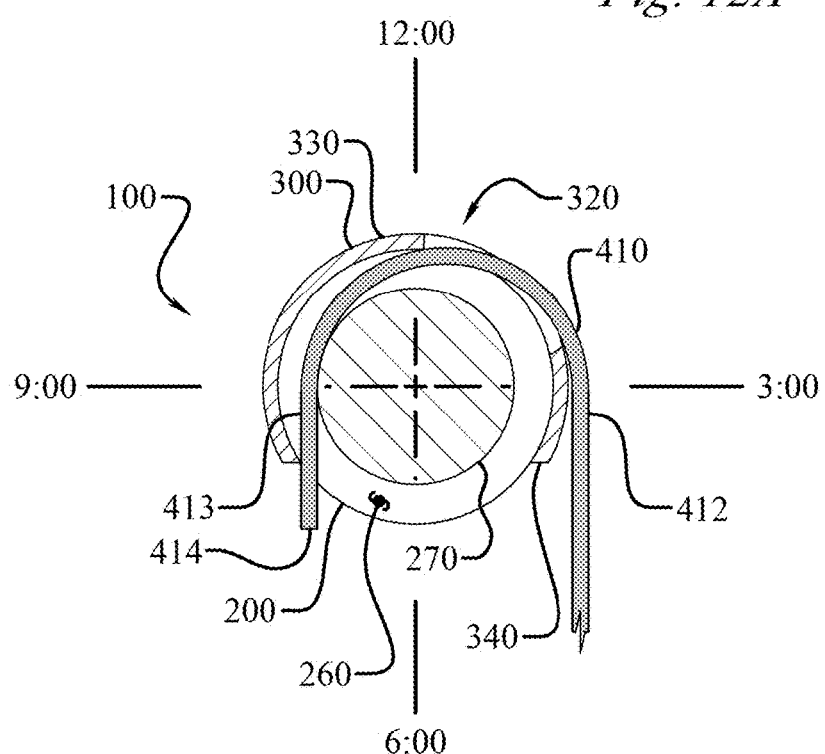
FIG. 13A is a cross-sectional view of a hanger entrapment system support, cover and hanger embodiment referenced in FIG. 7A, not to scale.
Figure 11B:
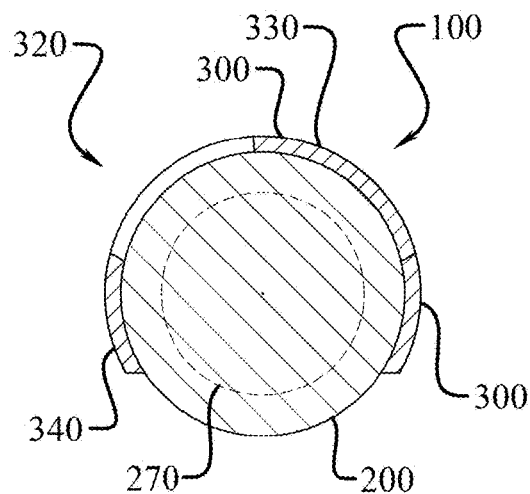
FIG. 11B is a cross-sectional view of a hanger entrapment system support and cover embodiment, not to scale.
Figure 12B:
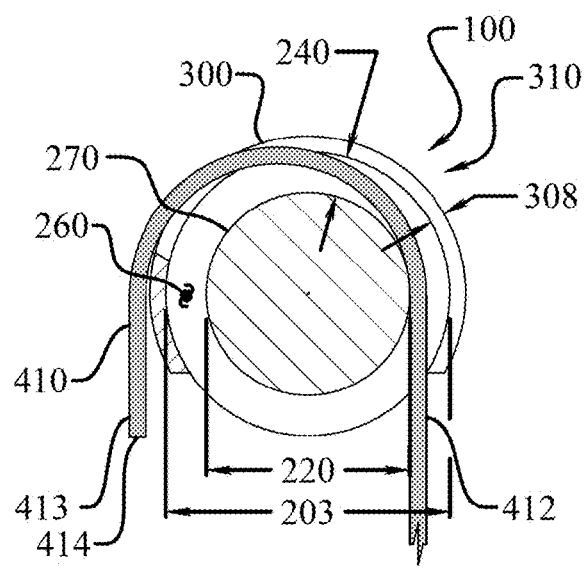
FIG. 12B is a cross-sectional view of a hanger entrapment system support, cover and hanger referenced in FIG. 6B, not to scale.
Figure 13B:
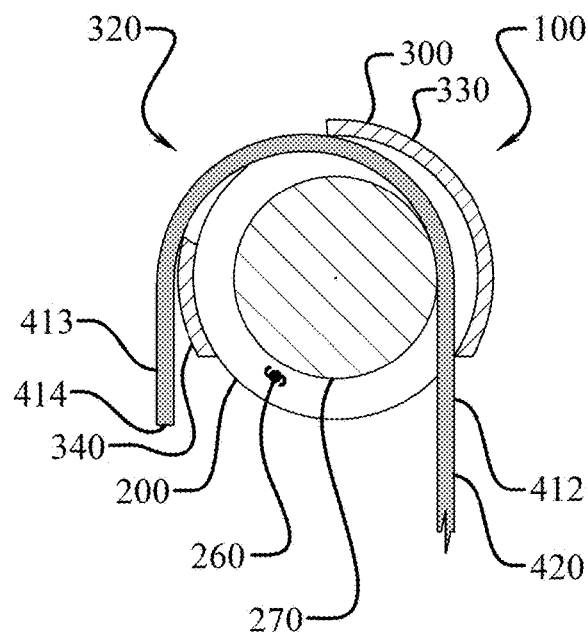
FIG. 13B is a cross-sectional view of a hanger entrapment system support, cover and hanger embodiment referenced in FIG. 7B, not to scale.

In the previously described embodiments a portion of the hook dextral side (412) and the hanger stem (420) were separated from the support recess (210) by the cover support member (340), however in another series of embodiments, seen in FIGS. 6B, 9B, 11B, 12B and 13B, it is the hook sinistral side (413) that is separated from the support recess (210) by the cover support member (340), while a portion of the hook dextral side (412) is captured within the support recess (210) by the cover entrapment protrusion (330). All of the prior disclosure also applies to this family of embodiments, and will not be repeated for the sake of brevity. As illustrated in FIG. 13B, there is less likelihood of the hanger (400) becoming disengaged during an impact via the hanger (400) bending and moving vertically since the hanger body (430) would impact the cover entrapment protrusion (330) in the embodiment of FIG. 13B versus the embodiment of FIG. 13A. Thus, in one embodiment the cover entrapment protrusion (330) extends across the 12 o'clock position of the support (200); for instance in the embodiment of FIG. 13B the cover entrapment protrusion (330) extends to approximately the 11:50 position, in further embodiments it may extend to at least one hour beyond the 12 o'clock position, namely to the left of the 11 o'clock position or the right of the 1 o'clock position, and in a further embodiment it may extend to at least two hours beyond the 12 o'clock position, namely to the left of the 10 o'clock position or the right of the 2 o'clock position, and even three hours beyond in still a further embodiment. The reference to positions on a clock face will be understood to one skilled in the art, however they are illustrated in FIG. 13A for reference.

Figure 7B:
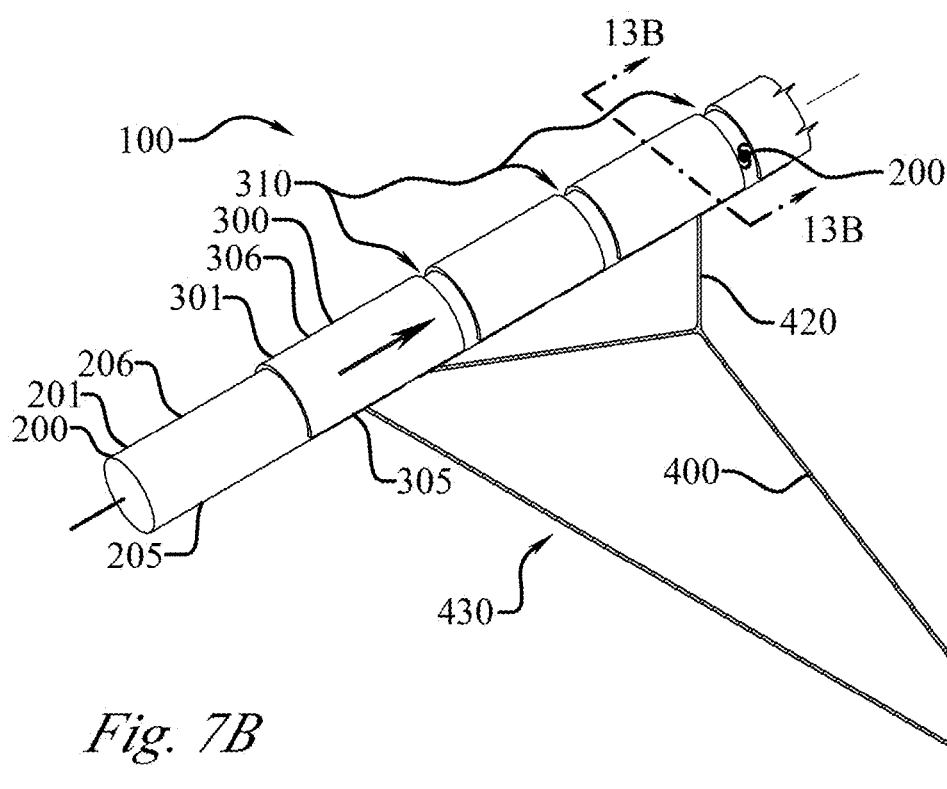
FIG. 7B is a partial dextral side isometric view of an embodiment of a hanger entrapment system support, cover and hanger, not to scale.
Figure 10A:
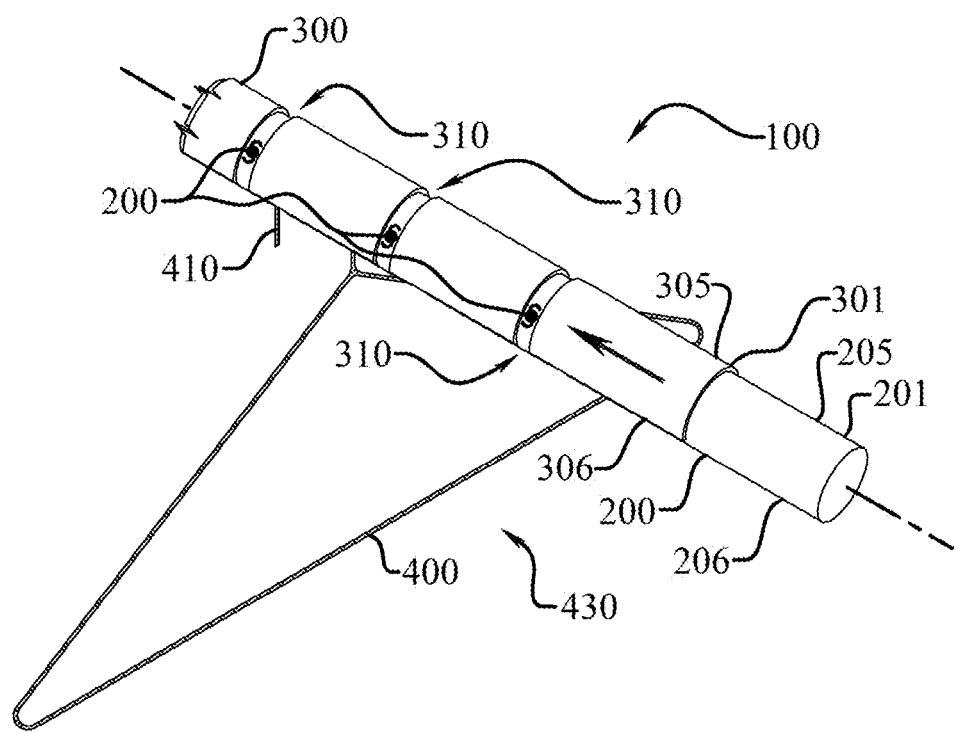
FIG. 10A is a partial sinistral side isometric view of an embodiment of a hanger entrapment system support, cover and hanger, not to scale.
Figure 10B:
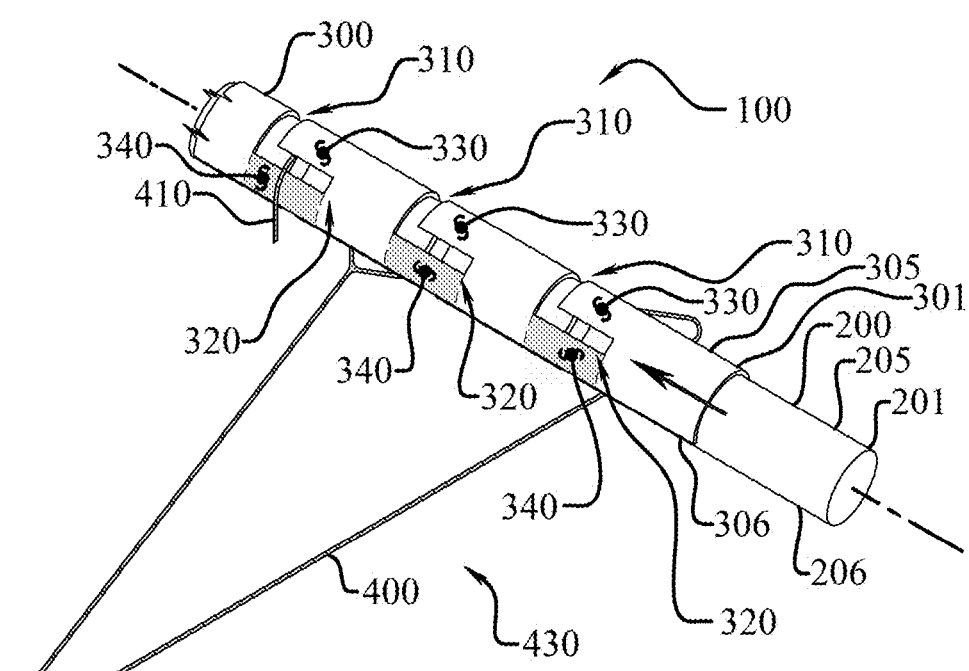
FIG. 10B is a partial sinistral side isometric view of an embodiment of a hanger entrapment system support, cover and hanger, not to scale.

FIG. 7B, its opposite side shown in FIG. 10B, and FIG. 13B show the same embodiment with the cover (300) in the hanger secured position. In order to place the cover (300) into a secured position, the user slides the cover (300) linearly along the hanger entrapment system support (200), or vice versa, so that the cover entrapment protrusion (330) overlaps and entraps at least a portion of the hook dextral side (412), and in some embodiments a portion of the hanger stem (420). As shown in FIGS. 10B and 13B, in this embodiment the hook sinistral side end (414) extends over the cover support member (340) and the hanger stem (420) protrudes out from the bottom side of the cover entrapment protrusion (330) and is held in place by the cover entrapment protrusion (330).

Figure 14:
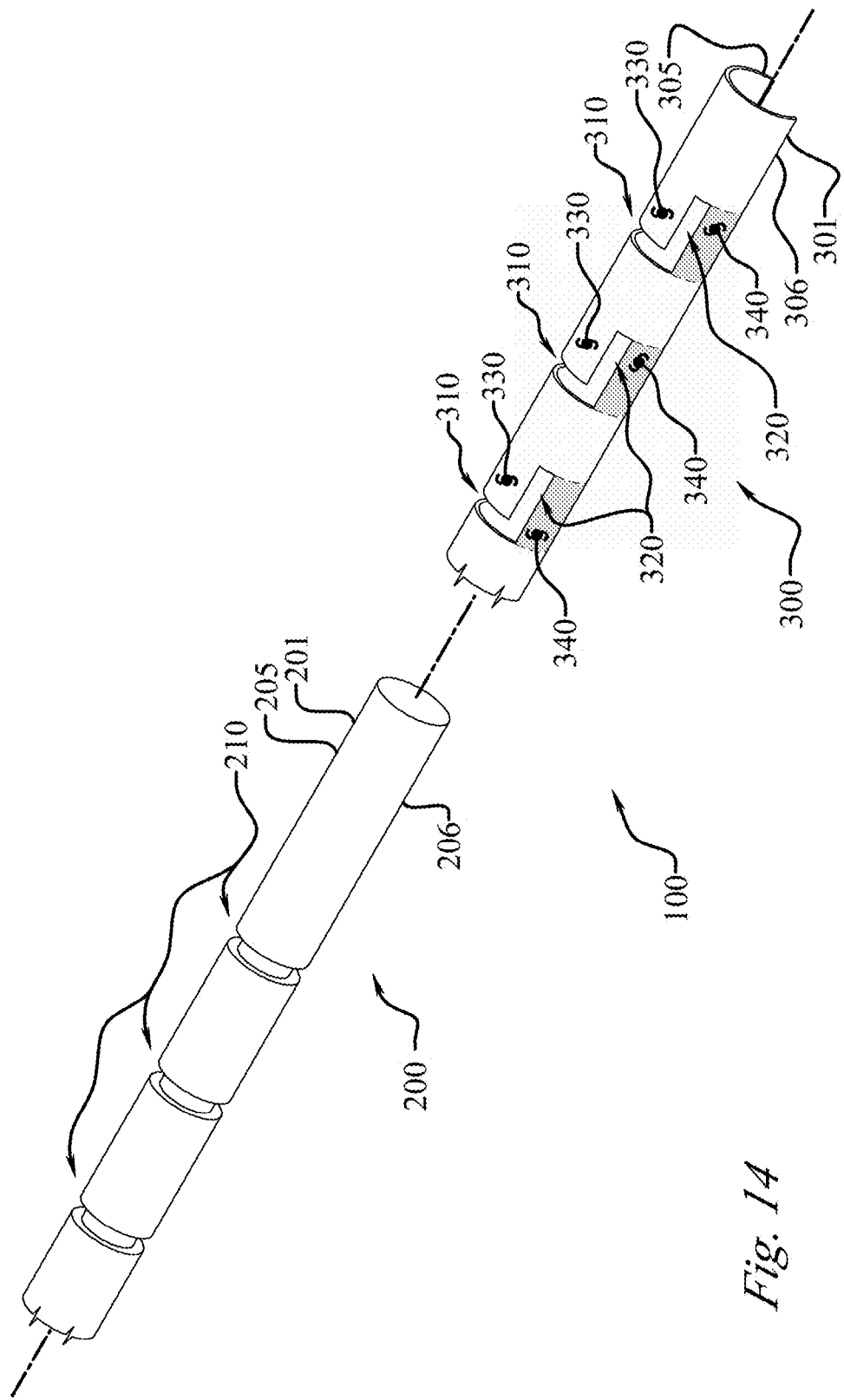
FIG. 14 is a partial sinistral side exploded isometric view of an embodiment of a hanger entrapment system support and cover, not to scale.
Figure 15:
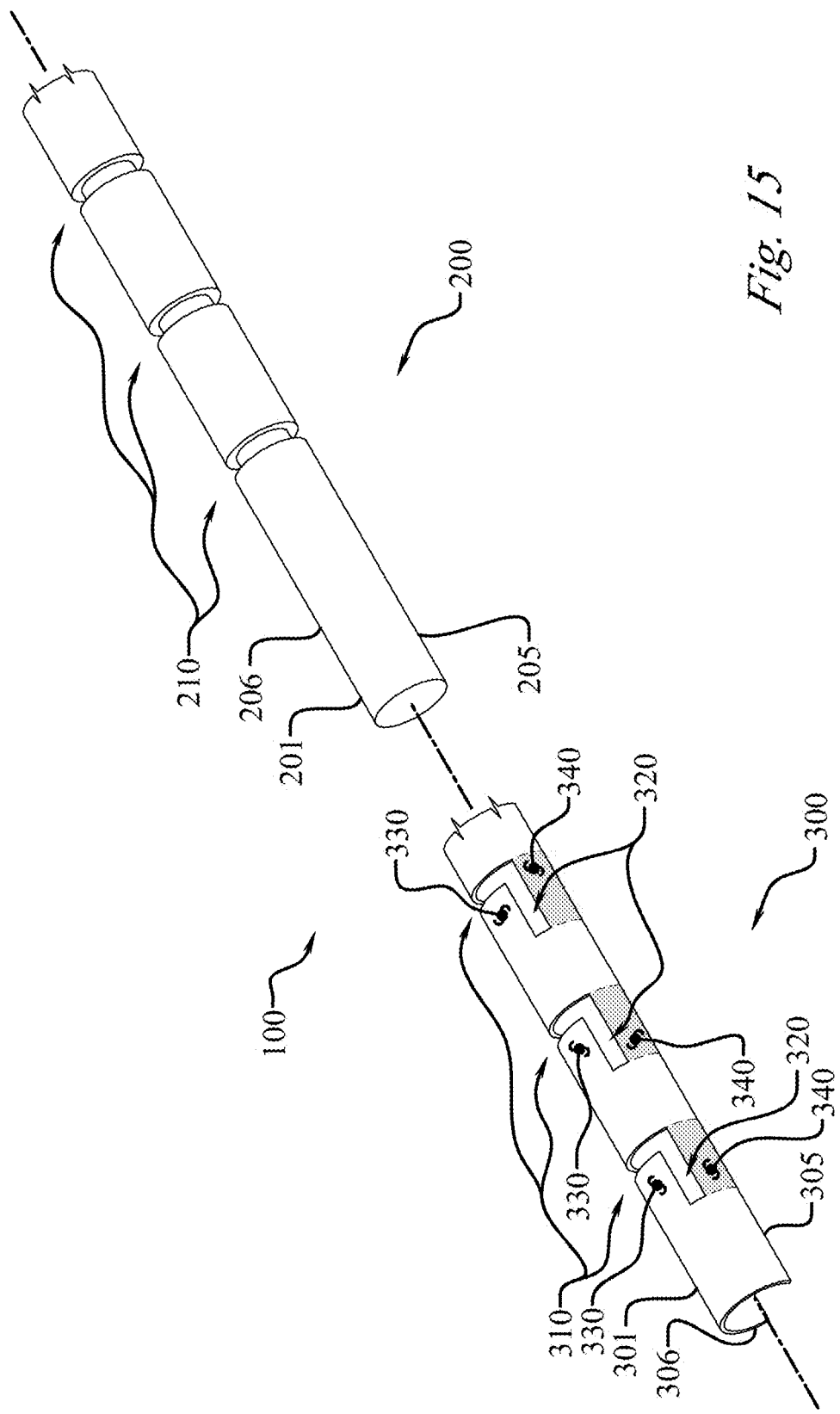
FIG. 15 is a partial dextral side exploded isometric view of an embodiment of a hanger entrapment system support and cover, not to scale.
Figure 16:
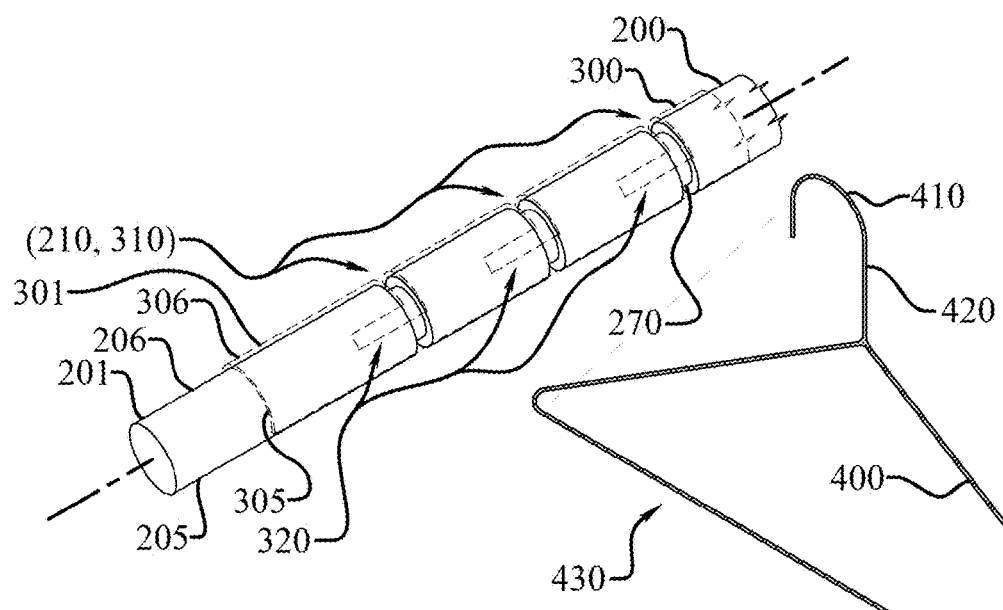
FIG. 16 is a partial dextral side isometric view of an embodiment of a hanger entrapment system support, cover and hanger, not to scale.
Figure 23:
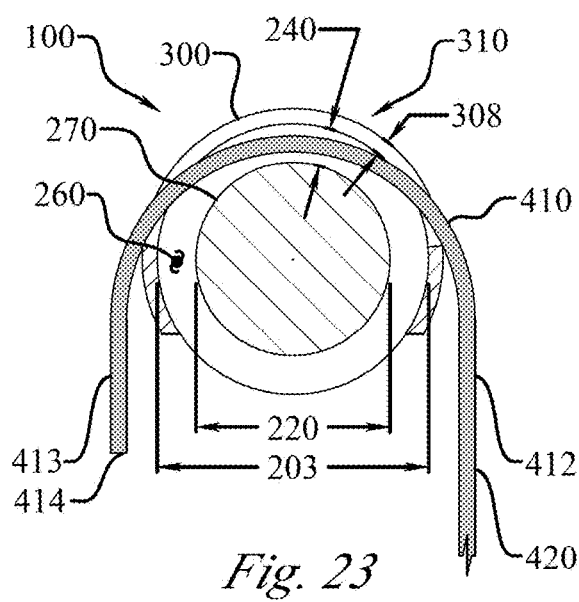
FIG. 23 is a cross-sectional view of a hanger entrapment system support, cover and hanger embodiment referenced in FIG. 17, not to scale.
Figure 24:
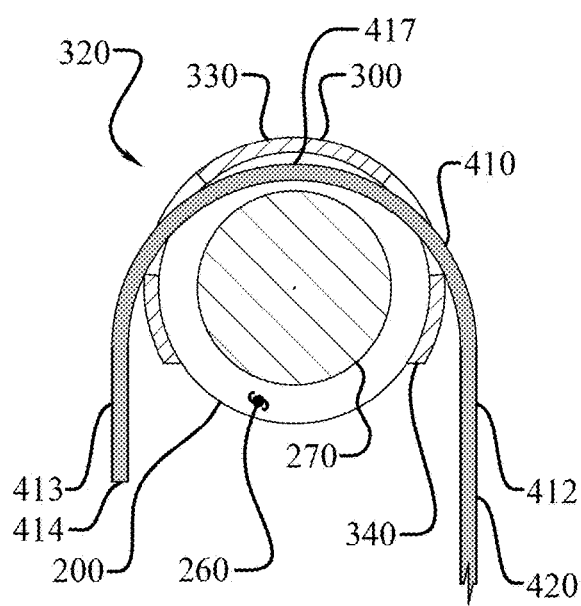
FIG. 24 is a cross-sectional view of a hanger entrapment system support, cover and hanger embodiment referenced in FIG. 18, not to scale.

FIGS. 14 and 15 illustrate opposite sides of an embodiment having at least two cover entrapment slots (320) for each cover aperture (310), specifically one on each side, as well as at least two cover support members (340) associated with each cover aperture (310). FIGS. 16-21 show the sequence of inserting and securing a hanger (400) within this embodiment, and the sections of FIGS. 22-24 illustrate the positions of the various components at the different stages. As seen in FIG. 24, in this embodiment the cover entrapment protrusion (330) extends over the hook apex (417) making it virtually impossible for the hanger (400) to become disengaged by vertical movement associated with a collision. Further, having a cover support member (340) at both the edge of the cover dextral side (305) and the edge of the cover sinistral side (306) significantly reduces the likelihood of the hanger hook (410) being bent, as the result of a collision, to the extent that the hanger hook (410) may become disengaged. This additional layer of security is provided via the cover support members (340) internally bracing, or supporting, the hanger hook (410) during a collision, and the cover entrapment protrusion (330) externally bracing, or constraining, the hanger hook (410) during a collision. As seen in FIGS. 23 and 24, the difference in the support width (203) and the recess width (220) determines the recess depth (240). In this embodiment, the recess depth (240) must be sufficient to allow the hanger hook (410) to slide over the cover support members (340) and underneath the cover entrapment protrusion (330). Thus, with reference to the section being the face of a clock with the center of the clock face aligned with the centroid of the support (200) when the section is taken through a support recess (210), in one embodiment the cover entrapment protrusion extends at least from 11 o'clock to 1 o'clock, and at least a portion of a cover support member (340) covers either, or both, 3 o'clock and 9 o'clock.

Figure 25:
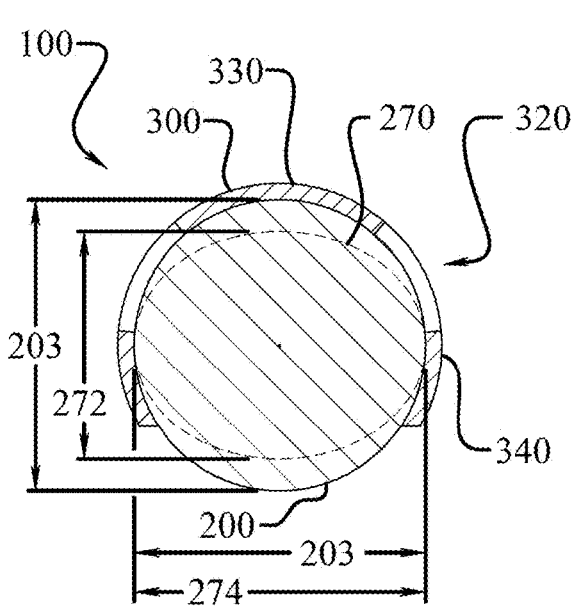
FIG. 25 is a cross-sectional view of a hanger entrapment system support and cover embodiment, not to scale.
Figure 26:
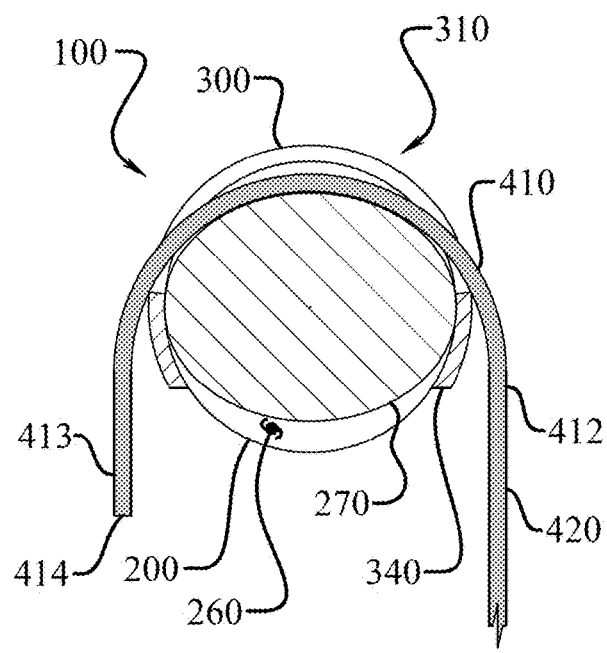
FIG. 26 is a cross-sectional view of a hanger entrapment system support, cover and hanger, not to scale.
Figure 27:
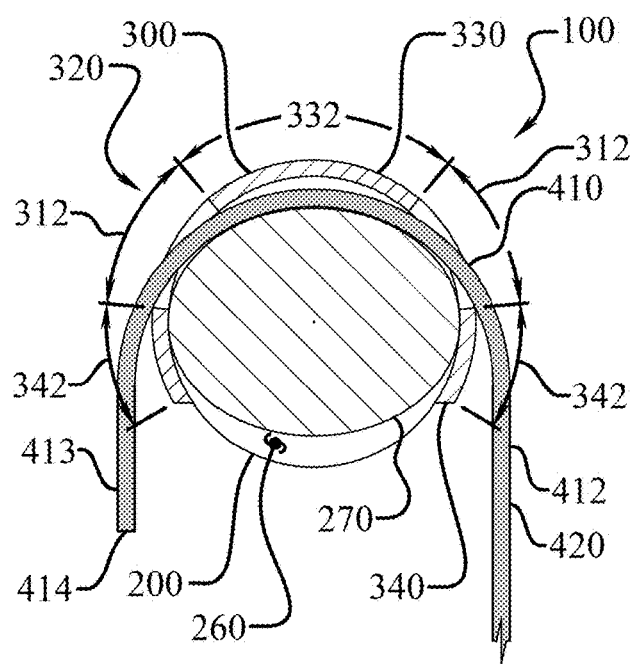
FIG. 27 is a cross-sectional view of a hanger entrapment system support, cover and hanger, not to scale.
Figure 28:
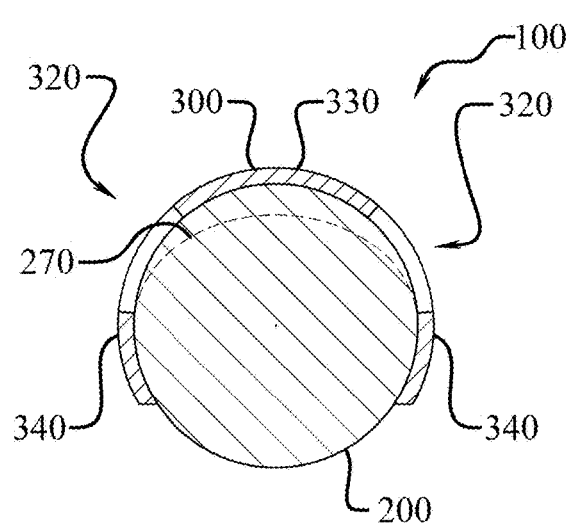
FIG. 28 is a cross-sectional view of a hanger entrapment system support and cover embodiment, not to scale.
Figure 29:
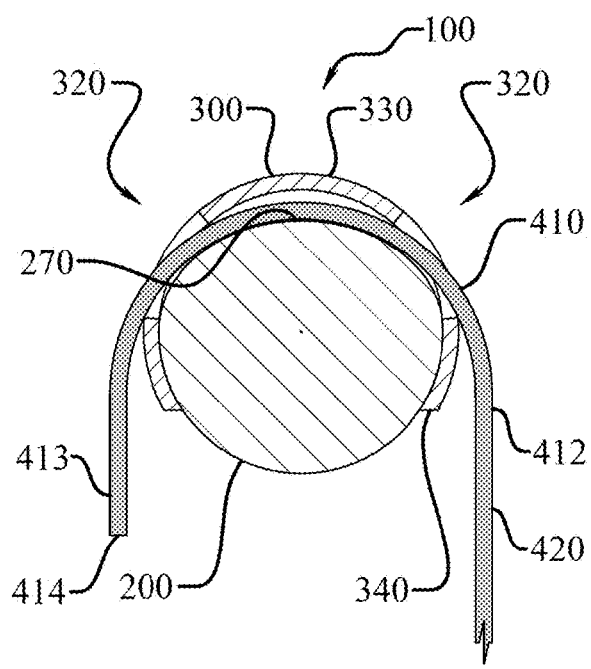
FIG. 29 is a cross-sectional view of a hanger entrapment system support, cover and hanger, not to scale.

In another embodiment as seen in FIGS. 25-27, the hanger entrapment system support (200) has a plurality of support recesses (210) with a recess floor (270) whose cross-section is not circular in nature. For instance, in the embodiment of FIG. 25 the recess floor (270) has a recess floor height (272), and a recess floor width (274) that is different than, and in some embodiments larger than, the recess floor height (272), thereby forming an oval shaped recess floor (270). One can appreciate the benefits of having an oval shaped recess floor (270) supporting more of the hanger hook (410), thereby further reducing the risk of deformation. Furthermore, as one can see in FIG. 27, an oval recess floor (270) may give better support to the hanger hook (410) from the hanger entrapment system support (200) and better securement from the cover entrapment protrusion (330) when the cover (300) is slid into the secured position. Additionally, the support recesses (210) do not necessarily have to be symmetrical in nature, as seen in FIGS. 28 and 29. In this embodiment, the support recesses (210) are only formed in the top portion of the hanger entrapment system support (200) and do not extend 360 degrees around the support (200). This would be particularly true in embodiments in which the cross-sectional profile of the support (200) is not simple round; for instance, in a rectangular tube embodiment the support recesses (210) may simply consist of a plurality of notches in the upper surface of the tube.

Figure 30:
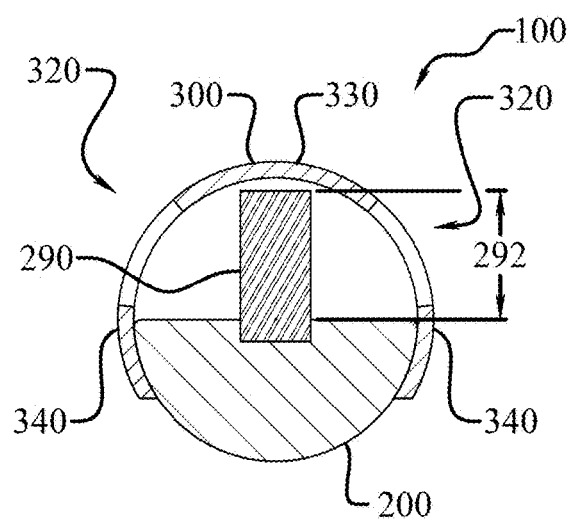
FIG. 30 is a cross-sectional view of a hanger entrapment system support and cover embodiment, not to scale.
Figure 31:
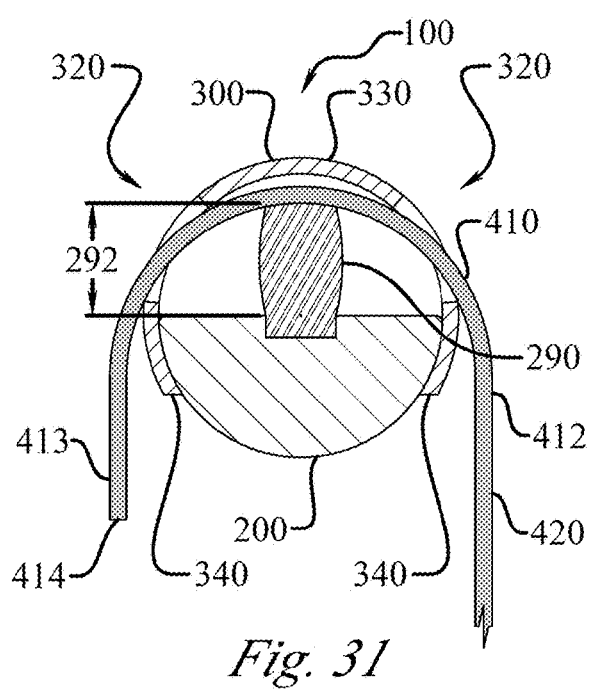
FIG. 31 is a cross-sectional view of a hanger entrapment system support, cover and hanger, not to scale.
Figure 32:
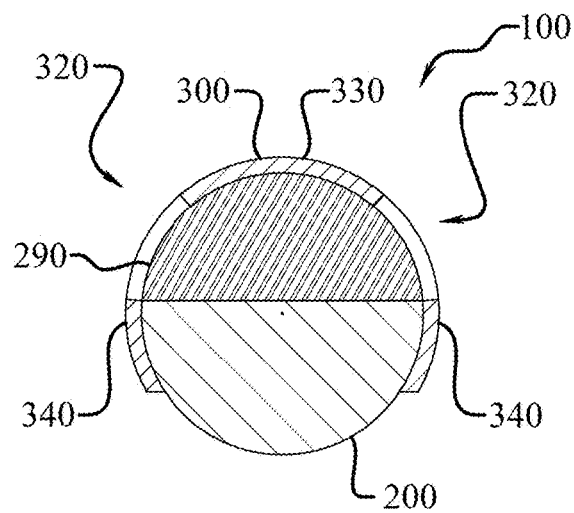
FIG. 32 is a cross-sectional view of a hanger entrapment system support and cover embodiment, not to scale.
Figure 33:
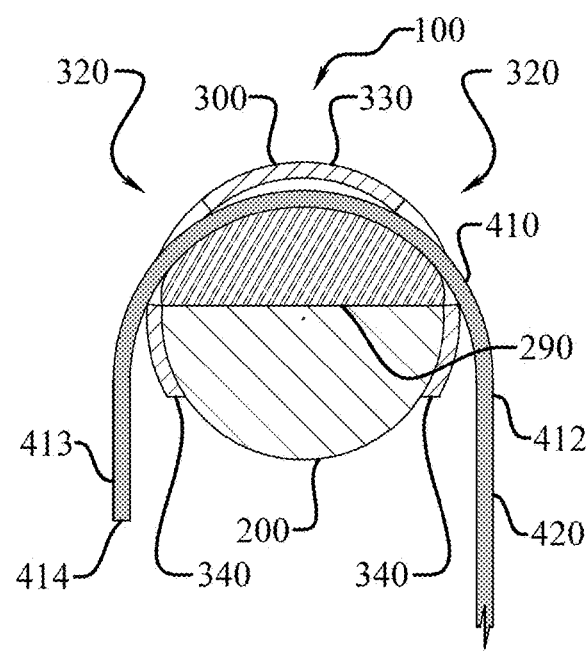
FIG. 33 is a cross-sectional view of a hanger entrapment system support, cover and hanger, not to scale.

In other embodiments the support recess (210) may have a support compression member (290). For instance, FIGS. 30 and 31 show a hanger entrapment system support (200) having a support compression member (290) that partially fills the support recess (210). FIG. 30 shows a hanger entrapment system support (200) having an uncompressed support compression member (290) with an uncompressed compression member height (292) that partially fills the support recess (210) without a hanger hook (410) positioned in the support recess (210). FIG. 31 shows a hanger entrapment system support (200) having a compressed support compression member (290) with a compressed compression member height (292) and a hanger hook (410) positioned in the support recess (210). In another embodiment, such as in FIGS. 32 and 33, the support compression member (290) may fill 100% of the support recess (210), in another embodiment the support compression member (290) may fill 10% to 99% of the support recess (210), in yet another embodiment, the support compression member (290) may fill 25% to 75% of the support recess (210), and in yet another embodiment, the support compression member (290) may fill 40% to 60% of the support recess (210). The support compression member (290) biases the hanger hook (410) against the cover entrapment protrusion (330) and helps keep the hanger (400) from becoming dislodged, while also accommodating a wider variety of hanger (400) sizes and stem thicknesses (421). Furthermore, in the preceding embodiments, the support compression member (290) may be composed of, but not limited to: rubber, plastic, other compressible viscoelastic materials, springs, pneumatic biasing devices, hydraulic biasing devices, cork, felt padding, composite materials, or a combination thereof.

In yet another embodiment, the support compression member (290) may consist of a biased plunger system having a compression member plunger (294) and a compression member bias device (296) and seen in FIGS. 34 and 35. FIG. 34 shows a hanger entrapment system support (200) with a plunger style compression member (290) without a hanger hook (410) installed in the support recess (210) having a compression member plunger (294) in a fully extended state. FIG. 35 shows the same embodiment with a hanger hook (410) installed in the support recess (210) and the compression member plunger (294) biasing the hanger hook (410) against the cover entrapment protrusion (330). It should be noted that the compression member plunger (294) can be composed of, but not limited to: plastic, metal, wood, hardened rubber, a viscoelastic material, stone, composite materials or a combination thereof. Additionally, the compression member bias device (296) may be composed of, but not limited to: a coil spring, a leaf spring, or a gas bladder.

Figure 36:
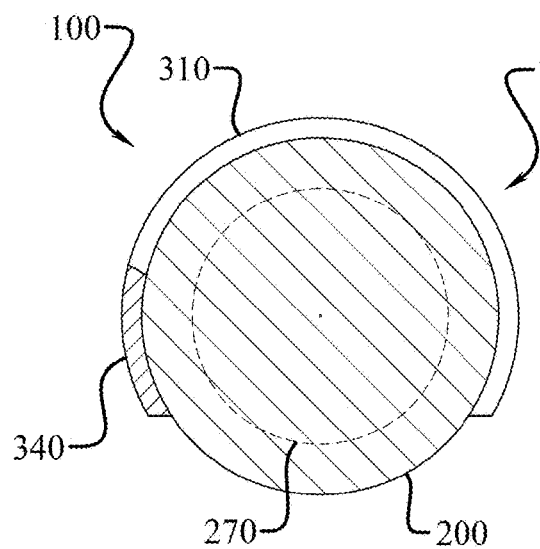
FIG. 36 is a cross-sectional view of a hanger entrapment system support and cover embodiment, not to scale.
Figure 37:
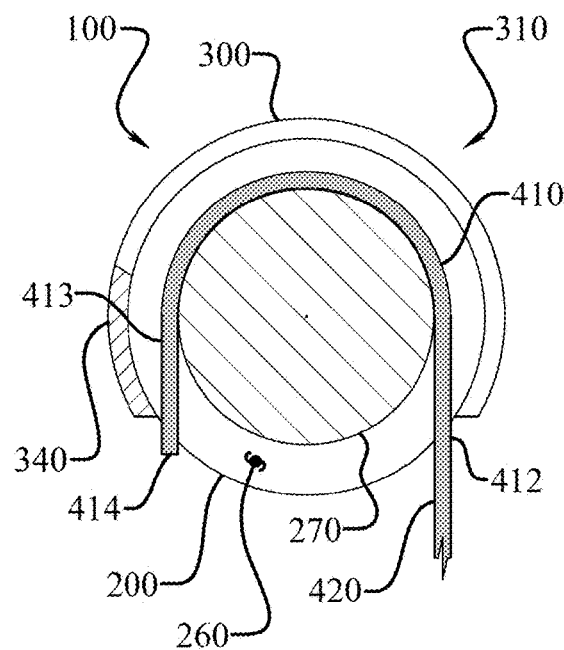
FIG. 37 is a cross-sectional view of a hanger entrapment system support, cover and hanger, not to scale.
Figure 38:
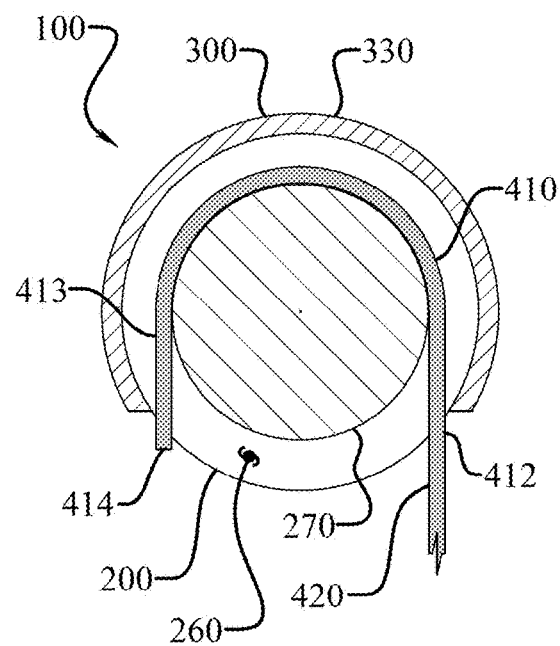
FIG. 38 is a cross-sectional view of a hanger entrapment system support, cover and hanger, not to scale.
Figure 39:
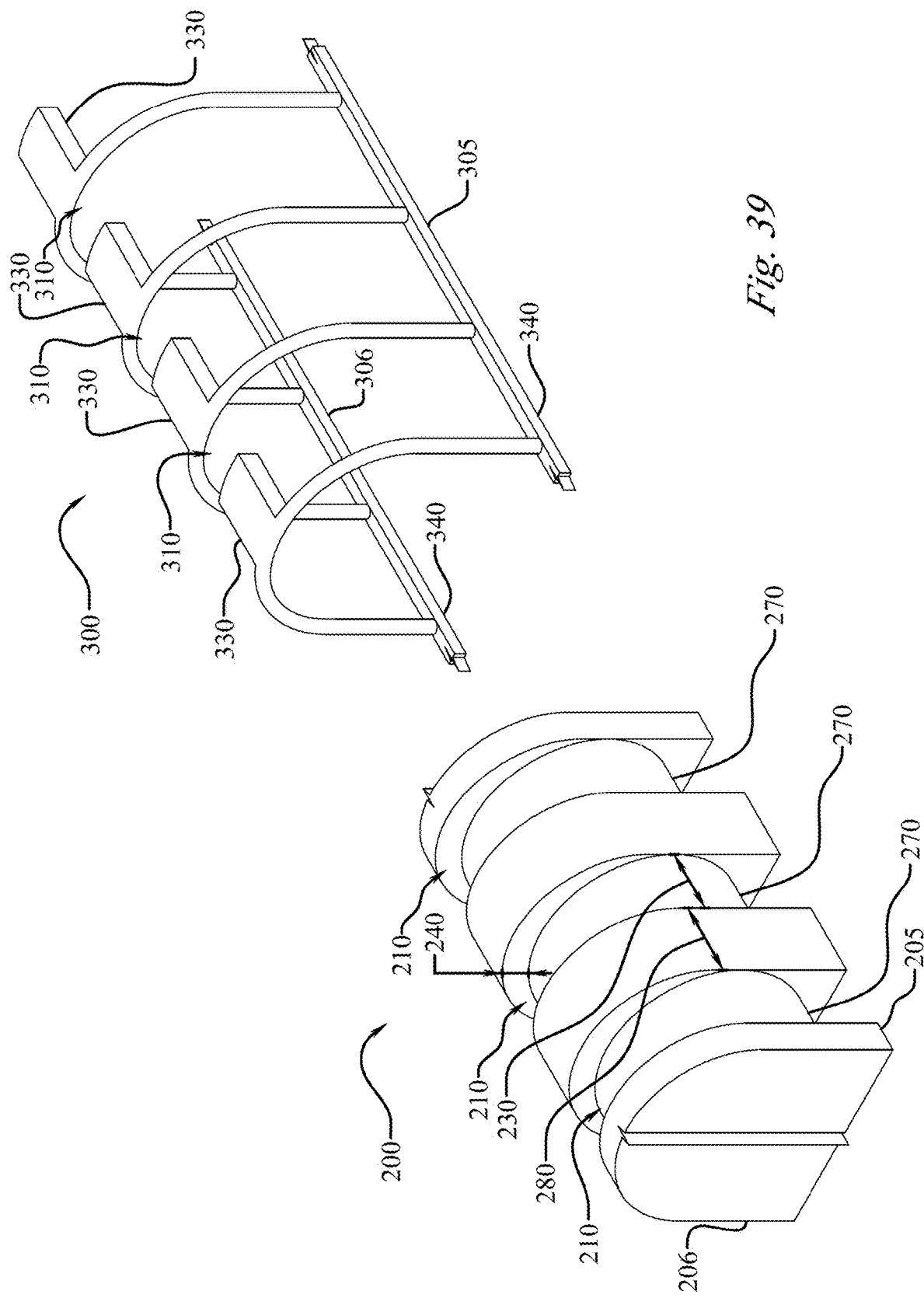
FIG. 39 is a partial dextral side exploded isometric view of an embodiment of a hanger entrapment system support and cover, not to scale.

In still yet another embodiment, as seen in FIGS. 36-38, the hanger hook (410) may fully resides within the support recess (210). Furthermore, FIG. 36 shows a cross section of the hanger entrapment system (100) with the cover aperture (310) not aligned with the support recess (210). FIG. 37 shows a cross section of the hanger entrapment system (100) with the cover aperture (310) aligned with the support recess (210) and a hanger hook (410) placed through the cover aperture (310) into the support recess (210). Lastly, in FIG. 38 the cover (300) has been moved into the secured position where the cover entrapment protrusion (330) overlaps both the hanger stem (420) and hook sinistral side end (414) thereby preventing the hanger (400) from accidently becoming dislodged.

In a further variation based upon FIG. 38 it is easy to appreciate that the cover (300) seen in FIG. 1B may consist of individual sections, not joined to one another, but rather slidably engaged with the support (200) so that any one of the individual cover sections may be engaged at any one time to present the cross-section of FIG. 38. In such embodiments each individual cover may engage a single support recess (210) or may engage multiple support recesses (210).

Figure 40:
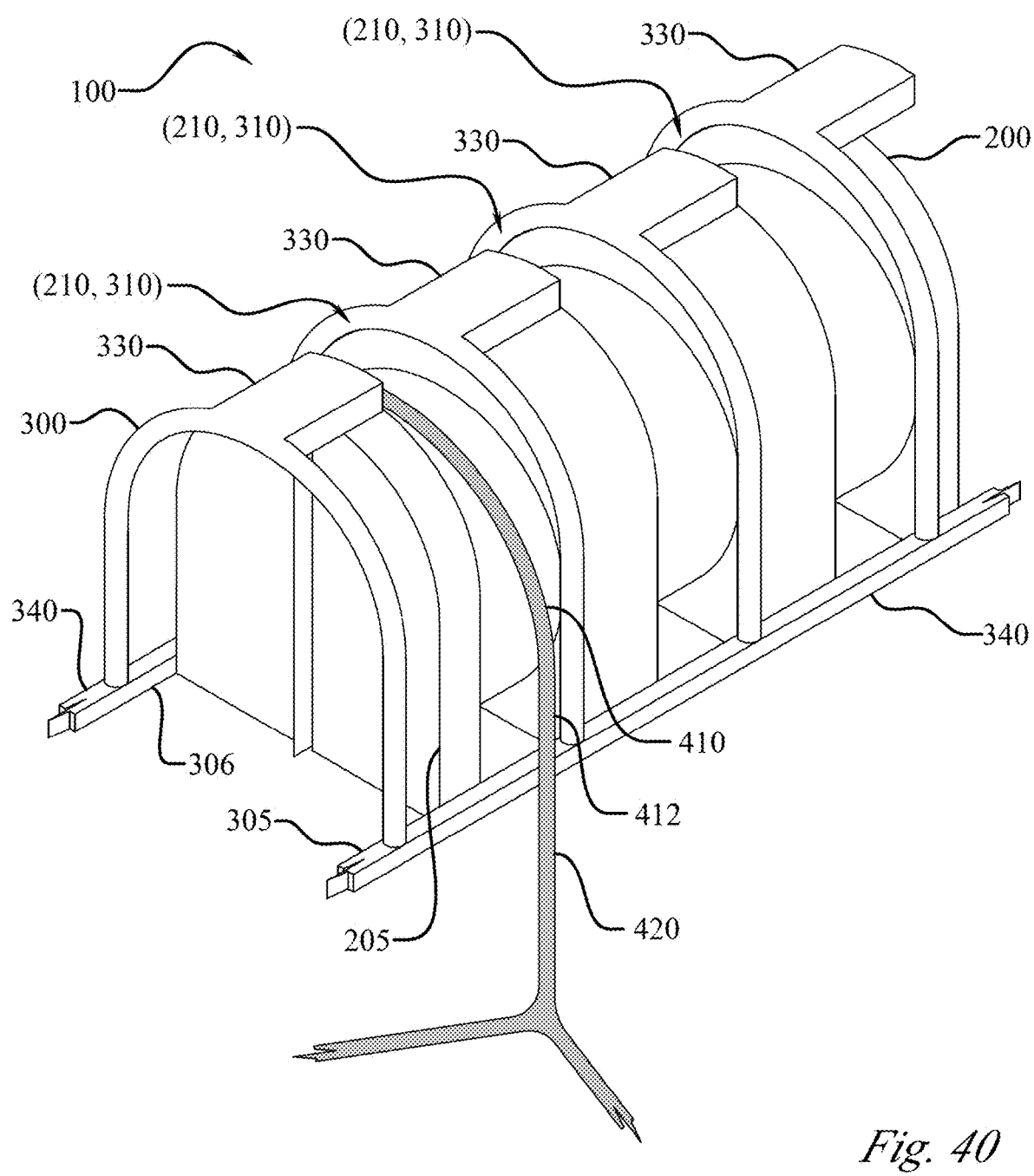
FIG. 40 is a partial dextral side isometric view of an embodiment of a hanger entrapment system support, cover and hanger, not to scale.
Figure 41:
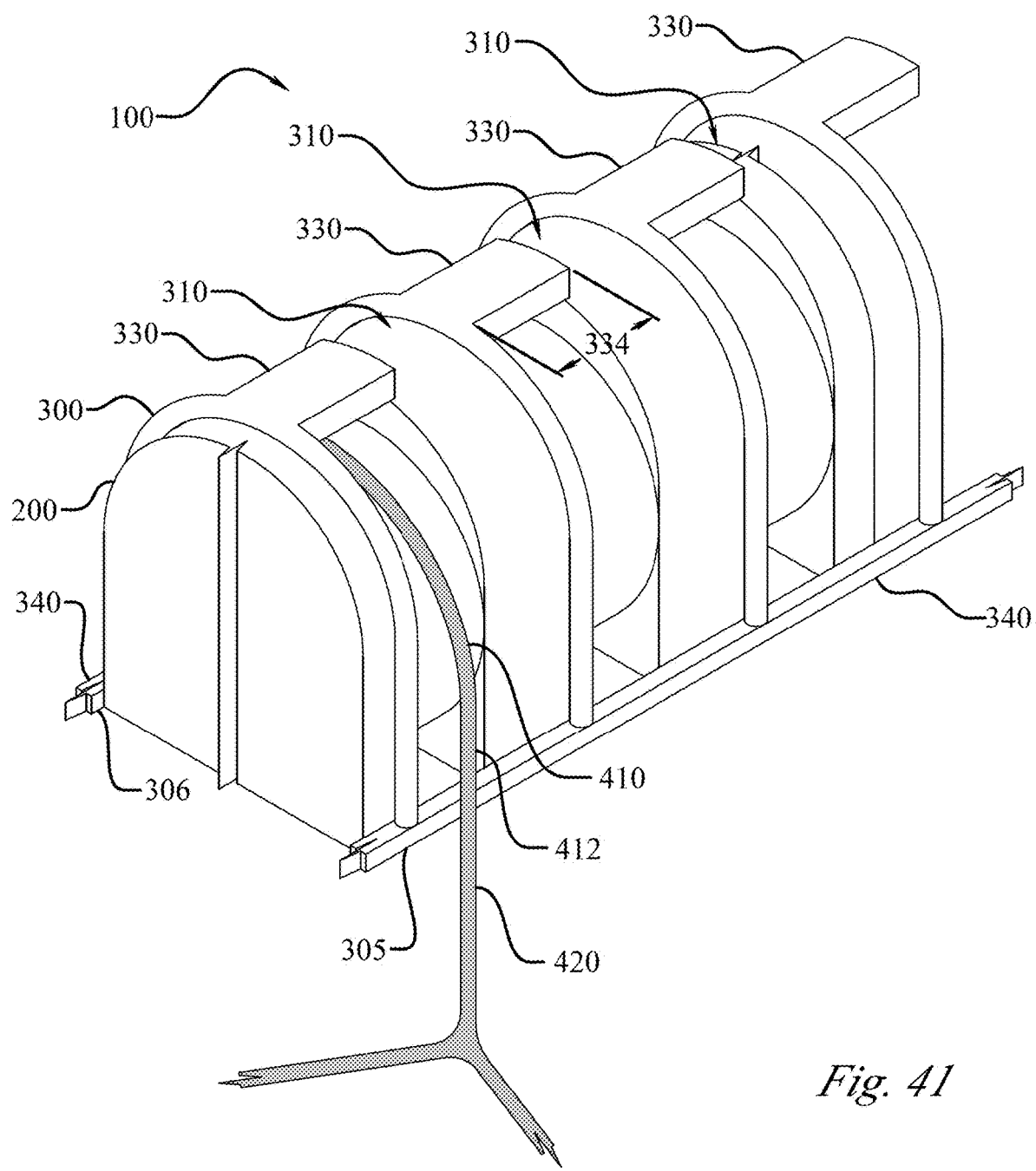
FIG. 41 is a partial dextral side isometric view of an embodiment of a hanger entrapment system support, cover and hanger, not to scale.

Further variations of the previously disclosed embodiments are illustrated in FIGS. 39-44. As one can see the hanger entrapment system supports (200) are not circular or oval shaped and have covers (300) that slides over the top of the hanger entrapment system supports (200), further reducing the weight of the system while maintain the desired safety. FIG. 40 shows an embodiment with an unsecured hanger hook (410) that has been placed within the support recess (210). Next, FIG. 41 shows the cover (300) moved into a secure position thereby securing the hanger hook (410), which in the illustrated embodiment includes a cover entrapment protrusion (330) located to cover the top of the hanger hook (410), i.e. the 12 o'clock position.

Figure 42:
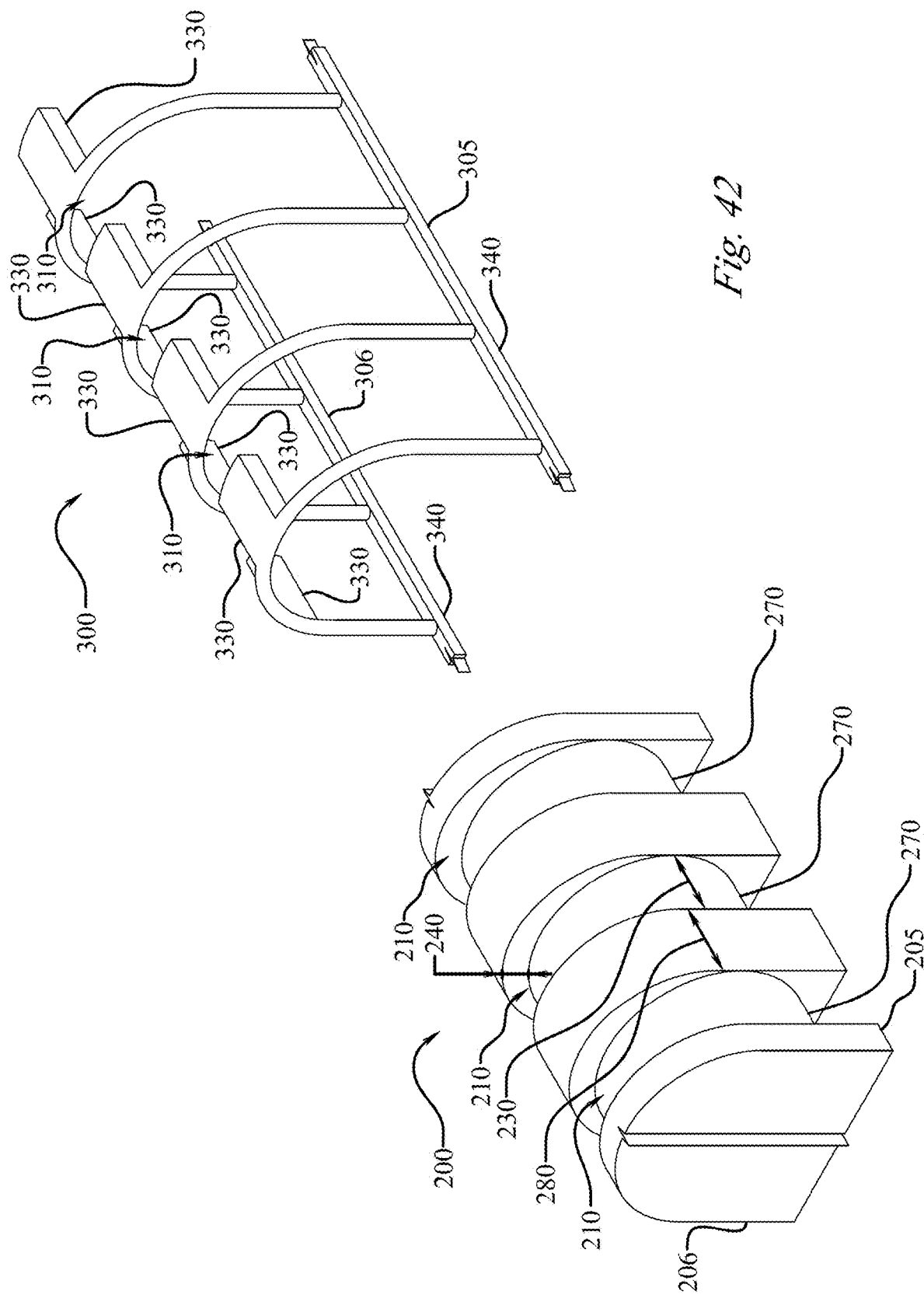
FIG. 42 is a partial dextral side exploded isometric view of an embodiment of a hanger entrapment system support and cover, not to scale.
Figure 43:
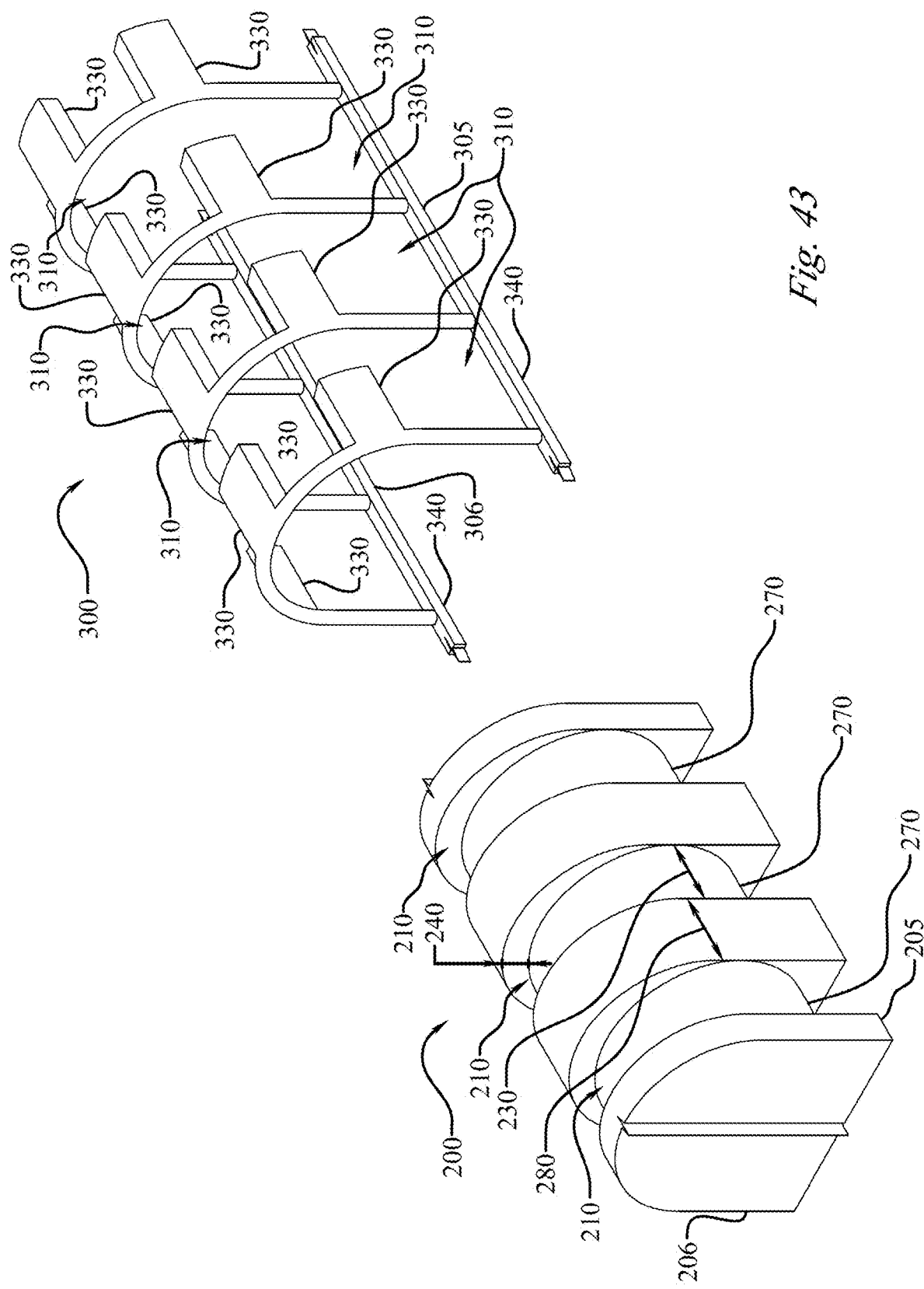
FIG. 43 is a partial dextral side exploded isometric view of an embodiment of a hanger entrapment system support and cover, not to scale.
Figure 44:
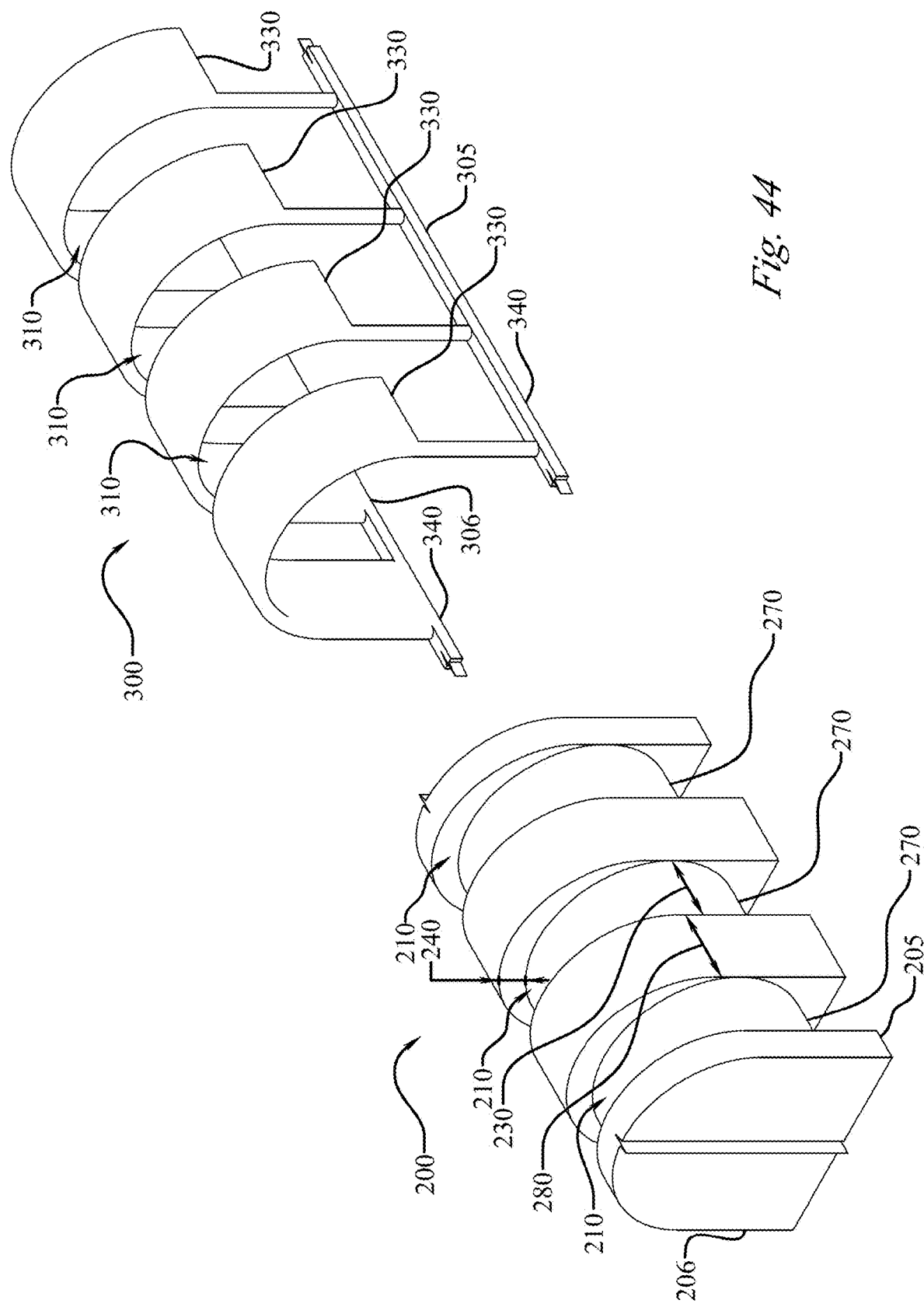
FIG. 44 is a partial dextral side exploded isometric view of an embodiment of a hanger entrapment system support and cover, not to scale.

FIG. 42 shows an embodiment of hanger entrapment system (100) wherein the cover (300) has two cover entrapment protrusions (330) allocated to cover each support recess (210), one at the 12 o'clock position and one at the 9 o'clock position. Similarly, FIG. 43 shows an embodiment wherein the cover (300) has three cover entrapment protrusions (330) allocated to cover each support recess (210). Lastly, FIG. 44 is an embodiment wherein the cover entrapment protrusions (330) cover a majority of the support recesses (210) when the cover (300) is placed in a secure state, namely located at the 12, 9, and 3 o'clock positions.

The system (100) may incorporate a locking mechanism to secure the support (200) and the cover (300) in the secured position, and optionally in the open position. Locking mechanisms for translational movement are known in the art and include, but not limited to, a locking tongue that engages a recess, opening, or flange in the other member, a spring-loaded projection system, and a rotate to lock/un-lock type of system. Alternatively, the cover (300) may be designed to flexibly expand and contract over the hanger entrapment system support (200) and securely clamp thereon, while still accommodating the sliding relative motion of the components necessary to entrap the hanger (400), as will be described in more detail later.

The hanger entrapment system (100) may be releasably attached to an automobile in several manners. The system (100) will generally be installed in the back seat of a vehicle via suspension from a handle (600) on each side of the automobile. In this embodiment a system connector (500) is attached to each end of the support (200). On skilled in the art will appreciate that the offset nature of the hanger stem (420) imparts a moment on the system (100) such that it wants to rotate. Typical hook shaped hangers designed to over-hook the handle (600) are incredibly dangerous because they are easily disengaged from the handle (600) during a collision. Similarly, prior art attachment methods of securing hanger rods to suspension supports often consists of little more than placing the hanger rod in a u-shaped hook, which is also extremely easy to become disengaged during a collision. Further such systems do nothing to account for the eccentric load placed on the rod due to the shape of a hanger. The need for safety and security in the attachment to the handle (600) must be balanced with the desire to have quick and easy installation.

Figure 45:
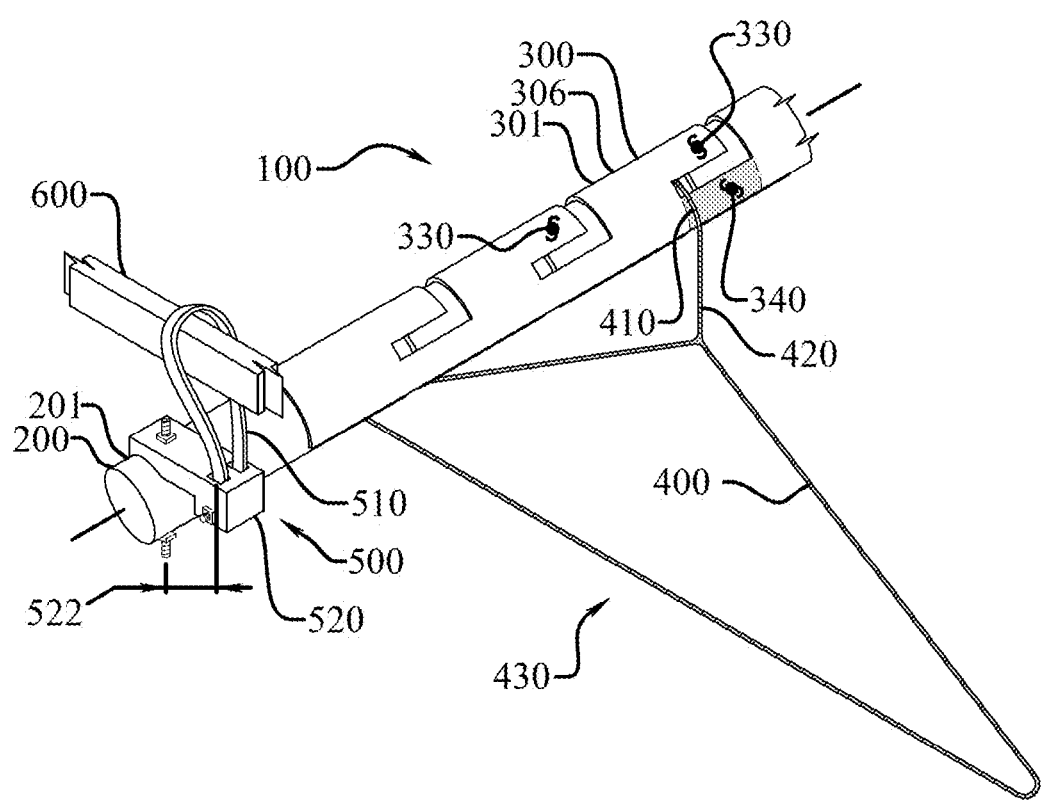
FIG. 45 is a partial dextral side isometric view of an embodiment of a hanger entrapment system support, cover and hanger, not to scale.

The embodiment of FIG. 45 includes a system connector (500) having an automobile load transfer member (510) that cooperates with the handle (600). In fact, in one embodiment it completely encircles the handle (600). In a further embodiment the load transfer member (510) is flexible, which in a further embodiment is a high strength band that is easily fed around a handle (600) regardless of the size or shape of the handle (600). Further a flexible load transfer member (510) is beneficial during a collision in that it allows some free movement of the system (100) without immediately exerting the full torque of a collision on the handle (600); after all, the hanger entrapment system (100) may easily hold in excess of 50 pounds of clothing. Further, the handles (600) used to mount the system (100) are not designed for dynamic impact loading, and are prone to simply snap off during an impact; after all, the purpose of such handles (600) is to help the ingress and egress of passengers into the auto. Therefore, flexible load transfer member (510) embodiments allow for a degree of movement during a collision, thereby reducing the likelihood of ripping the handles (600) from their mounts, or just simply snapping the handles (600).

In one embodiment the load transfer member (510) connects to, or incorporates, a connector offset member (520) designed to address the previously described moment and eccentric load, which are preferably not transferred to the handles (600). The other side of the connector offset member (520) is in communication with the support (200) or cover (300), which in the illustrated embodiment is simply a mechanical connection, however the connector offset member (520) may be formed with the support (200). The connector offset member (520) spaces the automobile load transfer member (510) away from a longitudinal axis of the system (100) by an offset distance (522) to counter at least a portion of the moment created on the system (100) by the eccentric hanger load. In one embodiment the offset distance (522) is at least 60% of the support width (203), and at least 75% in another embodiment, and at least 90% in still a further embodiment. Another series of embodiments caps the offset distance (522) to no more than twice the support width (203), and no more than 1.75 times the support width (203) in another embodiment, and no more than 1.5 times the support width (203) in still a further embodiment. In the embodiment of FIG. 45 the connector offset member (520) is rigidly attached to the support (200) at the centerline of the support (200), and the automobile load transfer member (510) is a high strength flexible band that may be fed over a wide variety of handles (600) and then securely attached to the load transfer member (510).

The automobile load transfer member (510) may be a rigid enclosure system that cooperates with, and completely encircles a portion of, the handle (600). In one embodiment a portion of the load transfer member (510) is spring-loaded and contains a locking mechanism so that once the load transfer member (510) receives the handle (600), a portion of the load transfer member (510) automatically closes around a portion of the handle (600) and locks to a stationary portion of the load transfer member (510). Alternatively, rather than a spring-loaded mechanism, a portion of the load transfer member (510) is configured such that when the handle (600) enters a region of the load transfer member (510) a portion of the load transfer member (510) is deflected resulting in the movement of an entrapment portion of the load transfer member (510) such that the entrapment portion moves to encircle the handle (600) within the load transfer member (510) and the entrapment portion releasably engages a stationary portion of the load transfer member (510). This movement may be accomplished via a cam or lever that is displaced when by a portion of the handle (600) and produces movement of a different portion that essentially closes behind the handle (600) as it enters.

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. A hanger entrapment system (100) for releasable attachment to an automobile and releasably secure a plurality of hangers (400) to the hanger entrapment system (100), comprising:
   a support (200) having a support proximal end (201), a support distal end (202), a support width (203), a support length (204), a support dextral side (205), and a support sinistral side (206),
      wherein the support (200) includes a plurality of support recesses (210) separated by a recess separation distance (280), and each support recess (210) having a recess width (220), a recess length (230) a recess depth (240), a recess proximal sidewall (250), a recess distal sidewall (260), and a recess floor (270);
   a cover (300) configured to engage the support (200) and (a) permit relative movement in an axial direction from an open position to a secured position, and (b) prevent separation in a transverse direction,
      wherein the cover (300) includes a cover proximal end (301), a cover distal end (302), a cover width (303), a cover length (304), a cover dextral side (305), a cover sinistral side (306), a cover thickness (308), a plurality of cover apertures (310) separated from adjacent apertures (310) by an aperture separation distance (316), a plurality of cover entrapment slots (320), a plurality of cover support members (340), and a cover throat dimension (350) measured between the cover dextral side (305) and the cover sinistral side (306), wherein the cover throat dimension (350) is less than at least a portion of the support width (203),
      wherein each cover aperture (310) has an aperture width (312) and an aperture length (314), and each cover entrapment slot (320) is in communication with one of the cover apertures (310) and has an entrapment slot width (322) and an entrapment slot length (324),
      wherein the cover (300) includes a plurality of cover entrapment protrusions (330) with each bounded at least in part by one of the plurality of cover apertures (310) and one of the plurality of cover entrapment slots (320), and each of the cover entrapment protrusions (330) has a protrusion width (332) and a protrusion length (334),
      wherein each of the cover support members (340) separates a portion of one of the cover apertures (310), and a portion of one of the cover entrapment slots (320), from an edge at one of the cover dextral side (305) and the cover sinistral side (306);
      wherein in the open position at least a portion of the cover aperture (310) and the support recess (210) align and allow entry of a portion of the hanger (400) through the cover aperture (310) and into the support recess (210); and
      wherein in the secured position the cover entrapment protrusion (330) extends over at least a portion of the support recess (210) and a portion of the hanger (400) extends through the cover entrapment slot (320).

2. The hanger entrapment system (100) of claim 1, wherein the protrusion width (332) is greater than the entrapment slot width (322).

3. The hanger entrapment system (100) of claim 2, wherein the entrapment slot length (324) is at least 50% greater than the aperture length (314).

4. The hanger entrapment system (100) of claim 3, wherein the aperture separation distance (316) is at least twice the aperture length (314).

5. The hanger entrapment system (100) of claim 4, wherein entrapment slot length (324) is at least 15% of the aperture separation distance (316).

6. The hanger entrapment system (100) of claim 5, wherein the recess depth (240) is at least 50% of the entrapment slot width (322).

7. The hanger entrapment system (100) of claim 6, wherein the cover (300) extends below a centroid of a section through the support (200) at the support recess (210), and a cover edge overlap dimension (360) is the distance measured vertically from an edge of the cover to the centroid, and the cover edge overlap dimension (360) is at least as great as the recess depth (240).

8. The hanger entrapment system (100) of claim 6, wherein in the secured position at least a portion of the cover entrapment protrusion (330) covers the support recess (210) at the 12 o'clock position.

9. The hanger entrapment system (100) of claim 8, wherein in the secured position at least a portion of the cover entrapment protrusion (330) covers the support recess (210) from the 11 o'clock position to the 1 o'clock position.

10. The hanger entrapment system (100) of claim 1, wherein the cover (300) has cover entrapment slots (320) on the cover dextral side (305) and the cover sinistral side (306).

11. The hanger entrapment system (100) of claim 1, further including a system connector (500) attached to each end of the support (200) and having a connector offset member (520) that spaces an auto load transfer member (510) away from a longitudinal axis of the system (100) by a offset distance (522) that is at least 60% of the support width (203).

12. A hanger entrapment system (100) for releasable attachment to an automobile and releasably secure a plurality of hangers (400) to the hanger entrapment system (100), comprising:
   a support (200) having a support proximal end (201), a support distal end (202), a support width (203), a support length (204), a support dextral side (205), and a support sinistral side (206),
      wherein the support (200) includes a plurality of support recesses (210) separated by a recess separation distance (280), and each support recess (210) having a recess width (220), a recess length (230) a recess depth (240), a recess proximal sidewall (250), a recess distal sidewall (260), and a recess floor (270);

a cover (300) configured to engage the support (200) and (a) permit relative movement in an axial direction from an open position to a secured position, and (b) prevent separation in a transverse direction, wherein the cover (300) includes a cover proximal end (301), a cover distal end (302), a cover width (303), a cover length (304), a cover dextral side (305), a cover sinistral side (306), a cover thickness (308), a plurality of cover apertures (310) separated from adjacent apertures (310) by an aperture separation distance (316), a plurality of cover entrapment slots (320), a plurality of cover support members (340), and a cover throat dimension (350) measured between the cover dextral side (305) and the cover sinistral side (306), wherein cover throat dimension (350) is less than at least a portion of the support width (203), wherein each cover aperture (310) has an aperture width (312) and an aperture length (314), and each cover entrapment slot (320) is in communication with one of the cover apertures (310) and has an entrapment slot width (322) and an entrapment slot length (324), and the entrapment slot length (324) is at least 50% greater than the aperture length (314), wherein the cover (300) includes a plurality of cover entrapment protrusions (330) with each bounded at least in part by one of the plurality of cover apertures (310) and one of the plurality of cover entrapment slots (320), and each of the cover entrapment protrusions (330) has a protrusion width (332) and a protrusion length (334), and the protrusion width (332) is greater than the entrapment slot width (322), wherein each of the cover support members (340) separates a portion of one of the cover apertures (310), and a portion of one of the cover entrapment slots (320), from an edge at one of the cover dextral side (305) and the cover sinistral side (306);

wherein in the open position at least a portion of the cover aperture (310) and the support recess (210) align and allow entry of a portion of the hanger (400) through the cover aperture (310) and into the support recess (210); and wherein in the secured position the cover entrapment protrusion (330) extends over at least a portion of the support recess (210) and a portion of the hanger (400) extends through the cover entrapment slot (320).

13. The hanger entrapment system (100) of claim 12, wherein the aperture separation distance (316) is at least twice the aperture length (314).

14. The hanger entrapment system (100) of claim 12, wherein entrapment slot length (324) is at least 15% of the aperture separation distance (316).

15. The hanger entrapment system (100) of claim 12, wherein the recess depth (240) is at least 50% of the entrapment slot width (322).

16. The hanger entrapment system (100) of claim 12, wherein the cover (300) extends below a centroid of a section through the support (200) at the support recess (210), and a cover edge overlap dimension (360) is the distance measured vertically from an edge of the cover to the centroid, and the cover edge overlap dimension (360) is at least as great as the recess depth (240).

17. The hanger entrapment system (100) of claim 12, wherein in the secured position at least a portion of the cover entrapment protrusion (330) covers the support recess (210) at the 12 o'clock position.

18. The hanger entrapment system (100) of claim 17, wherein in the secured position at least a portion of the cover entrapment protrusion (330) covers the support recess (210) from the 11 o'clock position to the 1 o'clock position.

19. The hanger entrapment system (100) of claim 12, wherein the cover (300) has cover entrapment slots (320) on the cover dextral side (305) and the cover sinistral side (306).

20. The hanger entrapment system (100) of claim 12, further including a system connector (500) attached to each end of the support (200) and having a connector offset member (520) that spaces an auto load transfer member (510) away from a longitudinal axis of the system (100) by a offset distance (522) that is at least 60% of the support width (203).

* * * * *